(12) United States Patent
Koike

(10) Patent No.: US 7,911,168 B2
(45) Date of Patent: Mar. 22, 2011

(54) METHOD AND DEVICE FOR CONTROLLING MOTOR, AND IMAGE FORMING APPARATUS

(75) Inventor: Takahisa Koike, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 433 days.

(21) Appl. No.: 12/068,411

(22) Filed: Feb. 6, 2008

(65) Prior Publication Data

US 2008/0203964 A1   Aug. 28, 2008

(30) Foreign Application Priority Data

Feb. 27, 2007   (JP) .................................. 2007-047646

(51) Int. Cl.
*H02P 7/29* (2006.01)

(52) U.S. Cl. .................... 318/432; 318/434; 318/610

(58) Field of Classification Search .................. 318/268, 318/400.06, 400.11, 599, 609, 610, 720–724, 318/430–434
See application file for complete search history.

(56) References Cited

U.S. PATENT DOCUMENTS

| | | | | |
|---|---|---|---|---|
| 4,358,726 A | * | 11/1982 | Iwakane et al. | 318/798 |
| 4,437,051 A | * | 3/1984 | Muto et al. | 318/808 |
| 4,851,982 A | * | 7/1989 | Tanahashi | 363/37 |
| 6,208,099 B1 | | 3/2001 | Kwon | |
| 7,177,552 B2 | | 2/2007 | Koike | |
| 2004/0100550 A1 | | 5/2004 | Bannai et al. | |

FOREIGN PATENT DOCUMENTS

| | | |
|---|---|---|
| CN | 1248092 | 3/2000 |
| CN | 1485696 | 3/2004 |
| JP | SHO62-167172 | 7/1987 |
| JP | SHO62-167174 | 7/1987 |
| JP | SHO62-171866 | 7/1987 |
| JP | HEI8-223970 | 8/1996 |
| JP | HEI8-223985 | 8/1996 |
| JP | 3263556 | 12/2001 |
| JP | 2004-229430 | 8/2004 |
| JP | 2005-080349 | 3/2005 |
| JP | 2005-278386 | 10/2005 |
| JP | 3744735 | 12/2005 |

OTHER PUBLICATIONS

Office Action dated Nov. 20, 2009 issued in corresponding Chinese Application No. 2008100741751 and English translation thereof.

* cited by examiner

*Primary Examiner* — Bentsu Ro
(74) *Attorney, Agent, or Firm* — Harness, Dickey & Pierce, P.L.C.

(57) ABSTRACT

A control unit controls a drive signal for determining a voltage to be supplied to the motor. A drive unit drives the motor by applying a current corresponding to the voltage determined based on the drive signal to the motor. The control unit includes a velocity detecting unit that detects a rotation velocity of the motor and an output unit that outputs the drive signal corresponding to a voltage with which a current lower than a predetermined current limit is applied to the motor, based on the rotation velocity of the motor detected by the velocity detecting unit.

15 Claims, 28 Drawing Sheets

OVERCURRENT CUTOFF WAVEFORM

CURRENT $i=(E-K_E\omega)/R$

METHOD AND DEVICE FOR CONTROLLING MOTOR, AND IMAGE FORMING APPARATUS

CROSS-REFERENCE TO RELATED APPLICATIONS

The present application claims priority to and incorporates by reference the entire contents of Japanese priority document 2007-047646 filed in Japan on Feb. 27, 2007. The present application incorporates by reference the entire contents of Japanese document 2006-262975 filed in Japan on Sep. 27, 2006.

BACKGROUND OF THE INVENTION

1. Field of the Invention

The present invention relates to a technology for limiting an electric current applied to a motor driver within a tolerance.

2. Description of the Related Art

A conventional method for protecting a motor driver employs detection of a temperature of the driver or detection of a drive current applied to the driver to prevent a flow of an overcurrent into the driver. According to a motor control device disclosed in Japanese Patent Application Laid-open No. 2005-80349, an overcurrent protecting circuit and a heat protecting circuit are included in an inverter circuit to protect switching elements of the inverter circuit.

Moreover, according to a technology disclosed in Japanese Patent Application Laid-open No. 2004-229430, when an overcurrent is detected, a signal indicating that a motor stops rotating due to the detection of the overcurrent in an overcurrent protecting circuit of the inverter circuit is output with a signal indicating the number of revolutions of the motor, so that an external microcomputer can determine whether an overcurrent is applied to the inverter circuit.

In this manner, in the conventional technologies for protecting the driver, an overcurrent determining circuit is provided to the driver. The overcurrent determining circuit determines whether an overcurrent is applied to the driver with a comparator that compares a current with a predetermined current limit. If the current exceeds the current limit, the overcurrent determining circuit determines that an overcurrent is applied to the driver.

Therefore, in the conventional technologies, it is necessary to include the comparator inside the motor control device. However, a power consumption increases because of a current sensing resistor of the comparator, and thus the efficiency decreases. Furthermore, in the conventional technologies, it is not possible to change setting of the current limit. Moreover, the conventional motor control device costs due to the comparator and the increased number of control integrated circuits (IC) and pins for the comparator.

SUMMARY OF THE INVENTION

It is an object of the present invention to at least partially solve the problems in the conventional technology.

According to an aspect of the present invention, there is provided a device for controlling a motor including a control unit that controls a drive signal for determining a voltage to be supplied to the motor; and a drive unit that drives the motor by applying a current corresponding to the voltage determined based on the drive signal to the motor. The control unit includes a velocity detecting unit that detects a rotation velocity of the motor, and an output unit that outputs the drive signal corresponding to a voltage with which a current lower than a predetermined current limit is applied to the motor, based on the rotation velocity of the motor detected by the velocity detecting unit.

Furthermore, according to another aspect of the present invention, there is provided a method of controlling a motor including detecting a rotation velocity of the motor; outputting a drive signal corresponding to a voltage with which a current lower than a predetermined current limit can be applied to the motor, based on the rotation velocity of the motor detected at the detecting; and driving the motor by applying a current corresponding to a voltage determined based on the drive signal to a coil of the motor.

Moreover, according to still another aspect of the present invention, there is provided an image forming apparatus that forms a toner image on a transfer member. The image forming apparatus includes a conveying unit that is supported in a rotatable manner, and conveys the transfer member; an image carrier that is supported in a rotatable manner, and carries the toner image; a charging unit that uniformly-charges a surface of the image carrier; a latent-image forming unit that forms a latent image on a surface of the image carrier that is uniformly-charged by the charging unit; a developing unit that develops the latent image formed by the latent-image forming unit into the toner image; a transfer unit that is supported in a rotatable manner, and transfers the toner image developed by the developing unit onto the transfer member; and a motor control device that controls driving a motor to rotate at least one of the conveying unit, the image carrier, the transferred member, and the transfer unit. The motor control device includes a control unit that controls a drive signal for determining a voltage to be supplied to the motor and a drive unit that drives the motor by applying a current corresponding to the voltage determined based on the drive signal to the motor. The control unit includes a velocity detecting unit that detects a rotation velocity of the motor and an output unit that outputs the drive signal corresponding to a voltage with which a current lower than a predetermined current limit is applied to the motor, based on the rotation velocity of the motor detected by the velocity detecting unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

A motor control device according to a first embodiment of the present invention calculates a current flowing into a driver based on a rotation velocity of a motor, and controls a pulse-width modulation (PWM) drive signal so that the calculated current is kept below a current limit.

The motor control device according to the first embodiment controls a motor included in an image forming apparatus, such as a digital multifunction peripheral (MFP) including a copy function, a FAX function, a printer function, a scanner function, an image delivering function for delivering an image of a document scanned by the scanner function or an image input by the printer function or the FAX function, and the like to the outside.

Figure 1:
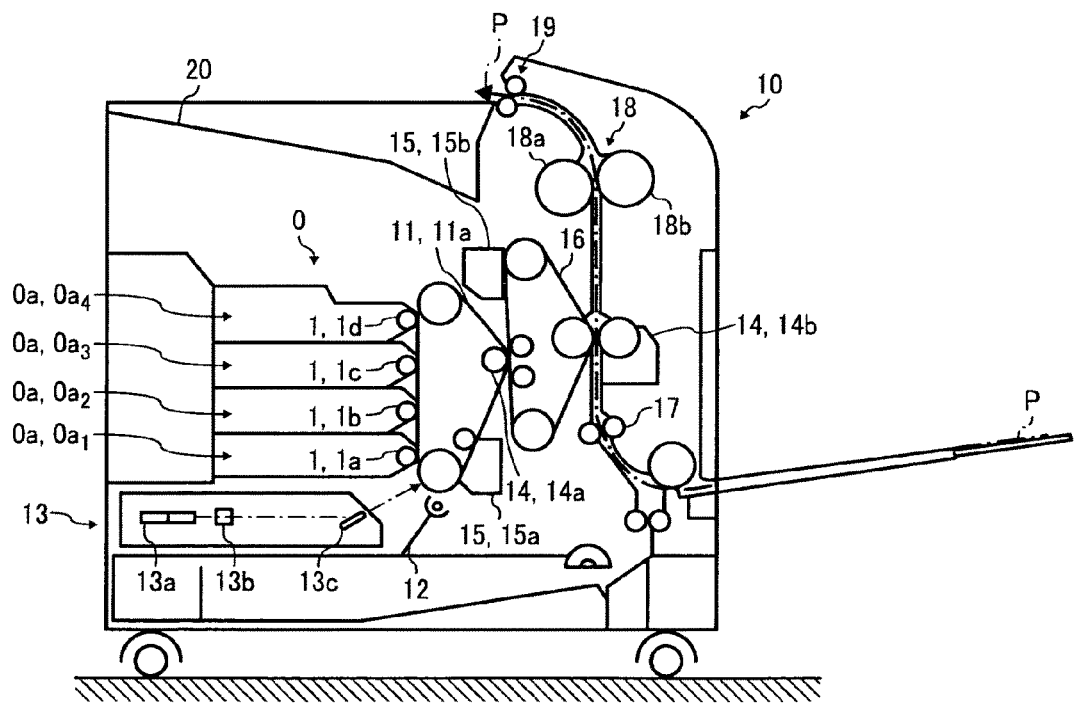
FIG. 1 is a schematic diagram of an image forming apparatus to which a motor control device according to the present invention is applied.

FIG. 1 is a schematic diagram of an image forming apparatus 10 to which the motor control device according to the first embodiment is applied. As shown in FIG. 1, the image forming apparatus 10 includes a photosensitive belt 11, a charging unit 12, a latent-image forming unit 13, a developing unit 0, a transfer unit 14, a cleaning unit 15, an intermediate transfer belt 16, a pair of conveying rollers 17, a fixing unit 18, a pair of discharging rollers 19, and a sheet tray 20.

The photosensitive belt 11 carries a toner image formed thereon, and is rotatably supported by rollers. An organic photosensitive layer is formed on a surface 11a of the photosensitive belt 11. The charging unit 12, the developing unit 0, a photosensitive-belt cleaning unit 15a included in the cleaning unit 15, and the like are arranged around the photosensitive belt 11.

The charging unit 12 applies a high voltage to the surface 11a to charge the surface 11a uniformly.

The latent-image forming unit 13 forms a latent image on the surface 11a uniformly-charged by the charging unit 12. The latent-image forming unit 13 includes a laser (not shown), a polygon mirror 13a, an fθ lens 13b, and a reflection mirror 13c. The latent-image forming unit 13 causes the laser to emit a laser light, for example, corresponding to an image signal into which image data input via a computer (not shown) is converted by each color.

Specifically, the laser emits laser lights corresponding to image signals for black (K), cyan (C), magenta (M), and yellow (Y) color images, respectively. The laser lights are emitted into the surface 11a via the polygon mirror 13a, the fθ lens 13b, and the reflection mirror 13c, and thereby forming electrostatic latent images for K, C, M, and Y colors on the surface 11a.

The developing unit 0 develops the electrostatic latent images formed by the latent-image forming unit 13 into K, C, M, and Y toner images. The developing unit 0 includes four toner cartridges 0a (a K-toner cartridge $0a_1$, a C-toner cartridge $0a_2$, an M-toner cartridge $0a_3$, and a Y-toner cartridge $0a_4$) and four developing rollers 1 (a K-toner developing roller 1a, a C-toner developing roller 1b, an M-toner developing roller 1c, and a Y-toner developing roller 1d). The K-toner cartridge $0a$, the C-toner cartridge $0a_2$, the M-toner cartridge $0a_3$, and the Y-toner cartridge $0a_4$ respectively contain K, C, M, and Y toners that are charged by the application of an electric charge corresponding to a voltage opposite to that of the surface 11a charged by the charging unit 12.

When the electrostatic latent images are developed into toner images, each of the developing rollers 1 supplies a toner to the photosensitive belt 11 by rotating with having contact with or keeping a slight distance from the photosensitive belt 11. A shock caused when each of the developing rollers 1 has contact with or keeps a slight distance from the photosensitive belt 11 is mitigated to reduce a shock jitter and the like, and thereby making it possible to form high-quality toner images at high speed.

The developing roller 1a, the developing roller 1b, the developing roller 1c, and the developing roller 1d are respectively included in the K-toner cartridge $0a_1$, the C-toner cartridge $0a_2$, the M-toner cartridge $0a_3$, and the Y-toner cartridge $0a_4$. The K, C, M, and Y toners contained in the toner cartridges $0a$ are supplied via the developing rollers 1a to 1d, and electrostatically adsorbed on the K, C, M, and Y electrostatic latent images on the surface 11a, respectively. As a result, the K, C, M, and Y electrostatic latent images are developed into K, C, M, and Y toner images, respectively.

The transfer unit 14 includes a primary transfer unit 14a and a secondary transfer unit 14b. The primary transfer unit 14a primarily transfers the toner images on the surface 11a onto the intermediate transfer belt 16. The secondary transfer unit 14b secondarily transfers the toner images transferred onto the intermediate transfer belt 16 onto a transferred member P such as a transfer sheet.

The photosensitive-belt cleaning unit 15a of the cleaning unit 15 scrapes out transfer residual toners on the surface 11a after the toner images are primarily transferred onto the intermediate transfer belt 16 to prepare for a subsequent image-forming process.

The intermediate transfer belt 16 has contact with a portion of the surface 11a. An electric charge opposite to that of the toners is applied to the intermediate transfer belt 16, and the toner images are sequentially transferred onto the intermediate transfer belt 16 to be superimposed thereon by the primary transfer unit 14a. As a result, a four-color superimposed image is formed on the intermediate transfer belt 16.

The conveying rollers 17 are used to convey a transferred member P. An electric charge opposite to that of the toners is applied to the transferred member P, and the four-color superimposed image on the intermediate transfer belt 16 is secondarily transferred onto the transferred member P by the secondary transfer unit 14b.

The fixing unit 18 includes a heating roller 18a and a pressure roller 18b. By the application of heat and pressure from the heating roller 18a and the pressure roller 18b, the toners of the four-color superimposed image are fused and fixed on the transferred member P.

The discharging rollers 19 are used to convey the transferred member P on which the four-color superimposed image is fixed to the sheet tray 20.

Figure 2:
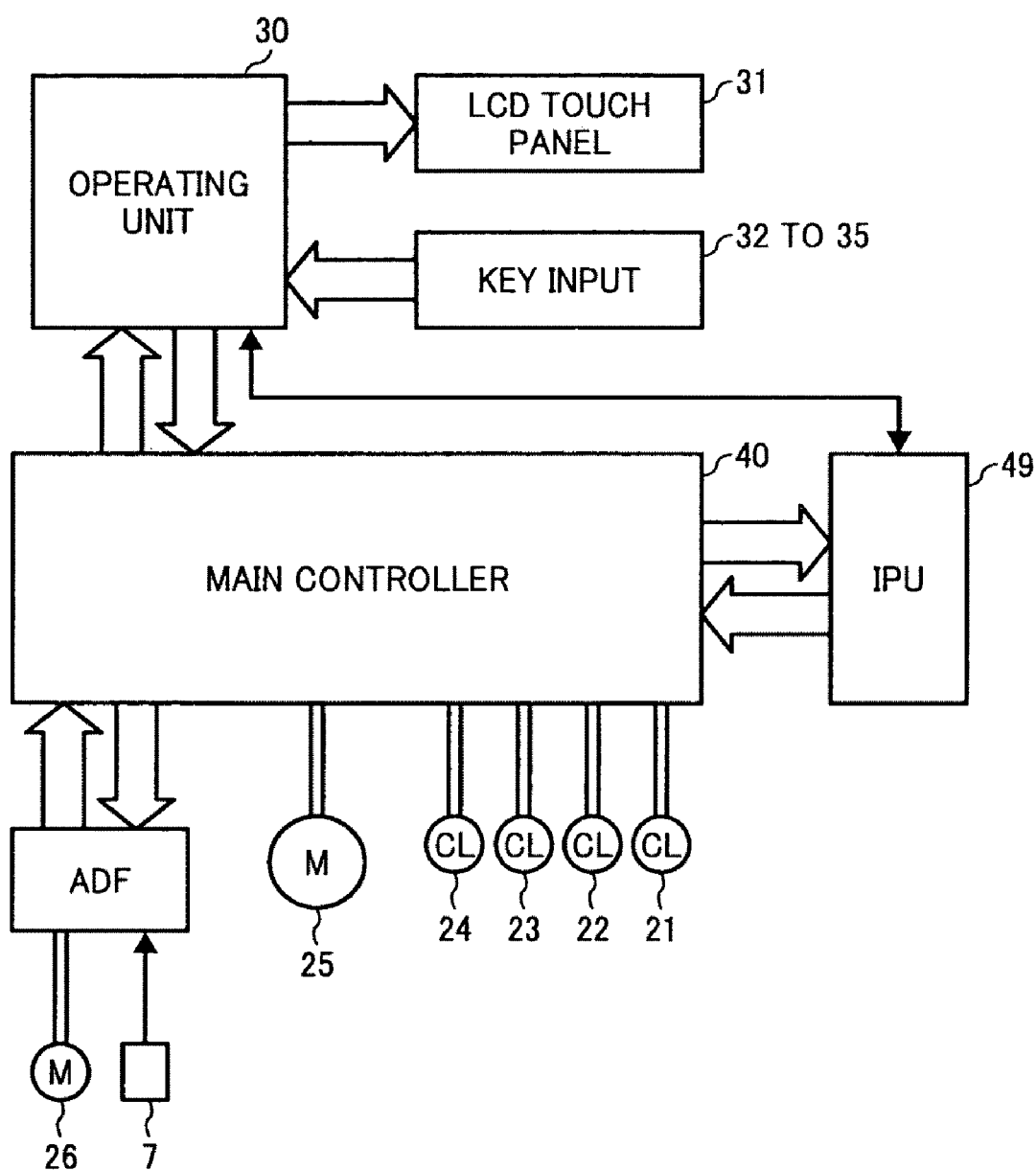
FIG. 2 is a schematic diagram illustrating a configuration of a control system of the image forming apparatus shown in FIG. 1.

Incidentally, the discharging rollers 19, the photosensitive belt 11, the conveying rollers 17, the heating roller 18a, the pressure roller 18b, and the developing rollers 1a to 1d are driven to rotate by a main motor 25 or a conveying motor 26 shown in FIG. 2. In the image forming apparatus 10, the toner images on the surface 11a are primarily transferred onto the intermediate transfer belt 16, and then the toner images on the intermediate transfer belt 16 are secondarily transferred onto the transferred member P. Alternatively, the toner images on the surface 11a can be transferred onto the transferred member P.

A control system the image forming apparatus 10, which includes a main controller 40 mainly, is explained below with reference to FIG. 2.

The main controller 40 included in the image forming apparatus 10 controls the entire image forming apparatus 10. The main controller 40 is connected to an operating unit 30, an image processing unit (IPU) 49, an auto document feeder (ADF), decentralized control devices (not shown) such as a finisher, and the like. The operating unit 30 is connected to a liquid crystal display (LCD) touch panel 31, a numeric keypad 32, a CLEAR/STOP key 33, a PRINT key 34, a WARMUP key 35, and the like.

The main controller 40 and each of the decentralized control devices exchange a state of the devices and an operation instruction with each other, if necessary. The main controller 40 is further connected to the main motor 25 required for conveying the transferred member P and the like, and clutches 21 to 24.

The main controller 40 includes a controller (the motor control device according to the first embodiment) for controlling the motors included in the image forming apparatus 10, such as the main motor 25 and the conveying motor 26. The motor control device included in the main controller 40 is explained in detail below.

Incidentally, the motor control device can control any of the motors including, but not limited to, the main motor 25. In addition, the motor control device can be applicable to not only the image forming apparatus 10 such as the digital MFP but also any kinds of apparatuses.

Figure 3:
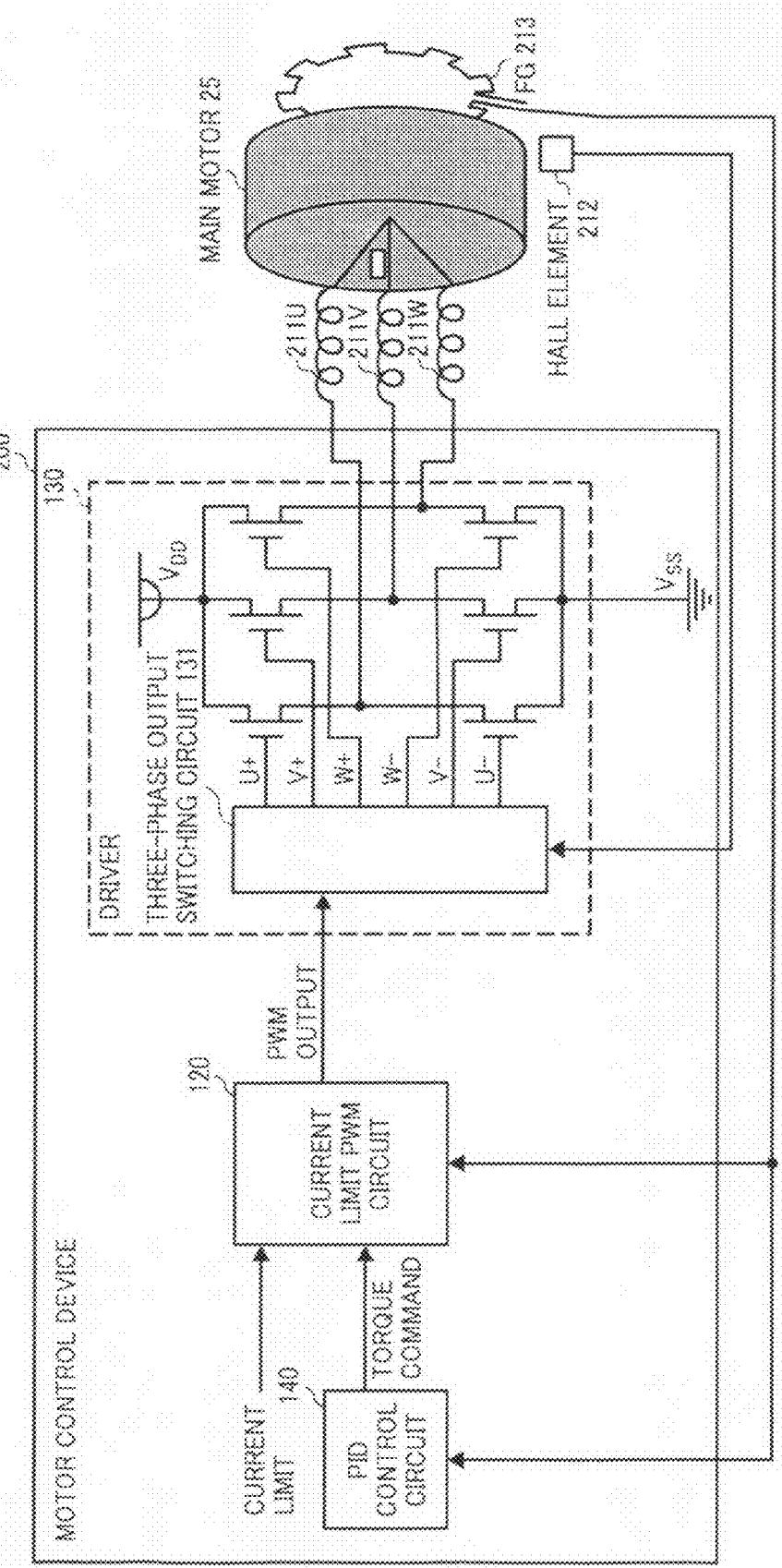
FIG. 3 is a block diagram of a motor control device according to a first embodiment of the present invention.

FIG. 3 is a block diagram of a motor control device 200 according to the first embodiment. As shown in FIG. 3, the main motor 25 is a three-phase motor, and includes coils 211U, 211V, and 211W corresponding to each phase, a hall element 212, and a frequency generator (FG) 213. The FG 213 outputs a pulse signal having a frequency corresponding to a revolution of the main motor 25. The motor control device 200 includes a proportional-integral-derivative (PID) control circuit 140, a driver 130, and a current limit PWM circuit 120.

The PID control circuit 140 performs a calculation with a PID control method based on an output from the FG 213, and outputs a PWM command value indicating a torque required for controlling the revolution of the main motor 25.

The driver 130 drives the main motor 25 by applying a current to the coils 211U, 211V, and 211W. The driver 130 includes a three-phase output switching circuit 131 and six numbers of field effect transistors (FETs). The three-phase output switching circuit 131 switches an output from each phase depending on an output from the hall element 212.

The current limit PWM circuit 120 outputs a PWM output (a PWM signal) to the driver 130. The PWM output is used to output a current limited not to exceeding a tolerance of the driver 130. The PWM output is determined based on the PWM command value, a pulse signal output from the FG 213 (an FG signal), and a current limit that is preliminarily defined to prevent a flow of an overcurrent into the driver 130.

Figure 4:
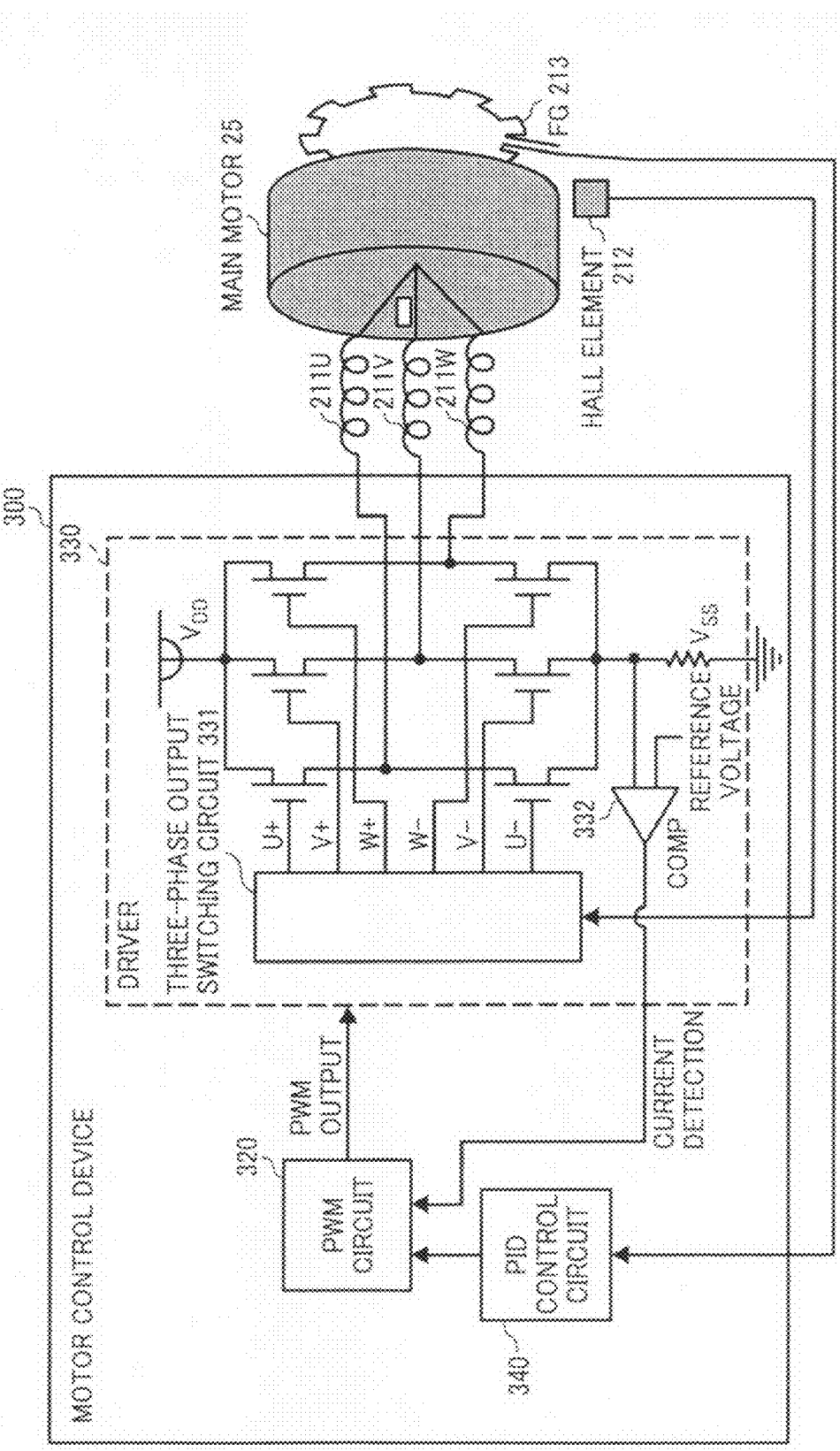
FIG. 4 is a block diagram of a motor control device according to a conventional technology.

Subsequently, an overcurrent protecting function applied to a driver included in a conventional motor control device is explained below. FIG. 4 is a block diagram of a motor control device 300 according to a conventional technology. As shown in FIG. 4, the motor control device 300 includes a PID control circuit 340, a driver 330, and a PWM circuit 320.

The PID control circuit 340 performs a calculation with the PID control method based on an output from the FG 213, and outputs a PWM command value in the same manner as the PID control circuit 140.

The driver 330 includes a comparator 332 in addition to a three-phase output switching circuit 331. The three-phase output switching circuit 331 switches an output from each phase depending on an output from the hall element 212. The comparator 332 compares a current flowing into the driver 330 with a reference value.

The PWM circuit 320 outputs a PWM signal to the driver 330 in accordance with the PWM command value input from the PID control circuit 340. In the motor control device 300, if a drive current flowing into the driver 330 exceeds the reference value, the comparator 332 outputs a signal to the PWM circuit 320 so that the PWM signal output from the PWM circuit 320 to the driver 330 is turned OFF.

Figure 5:
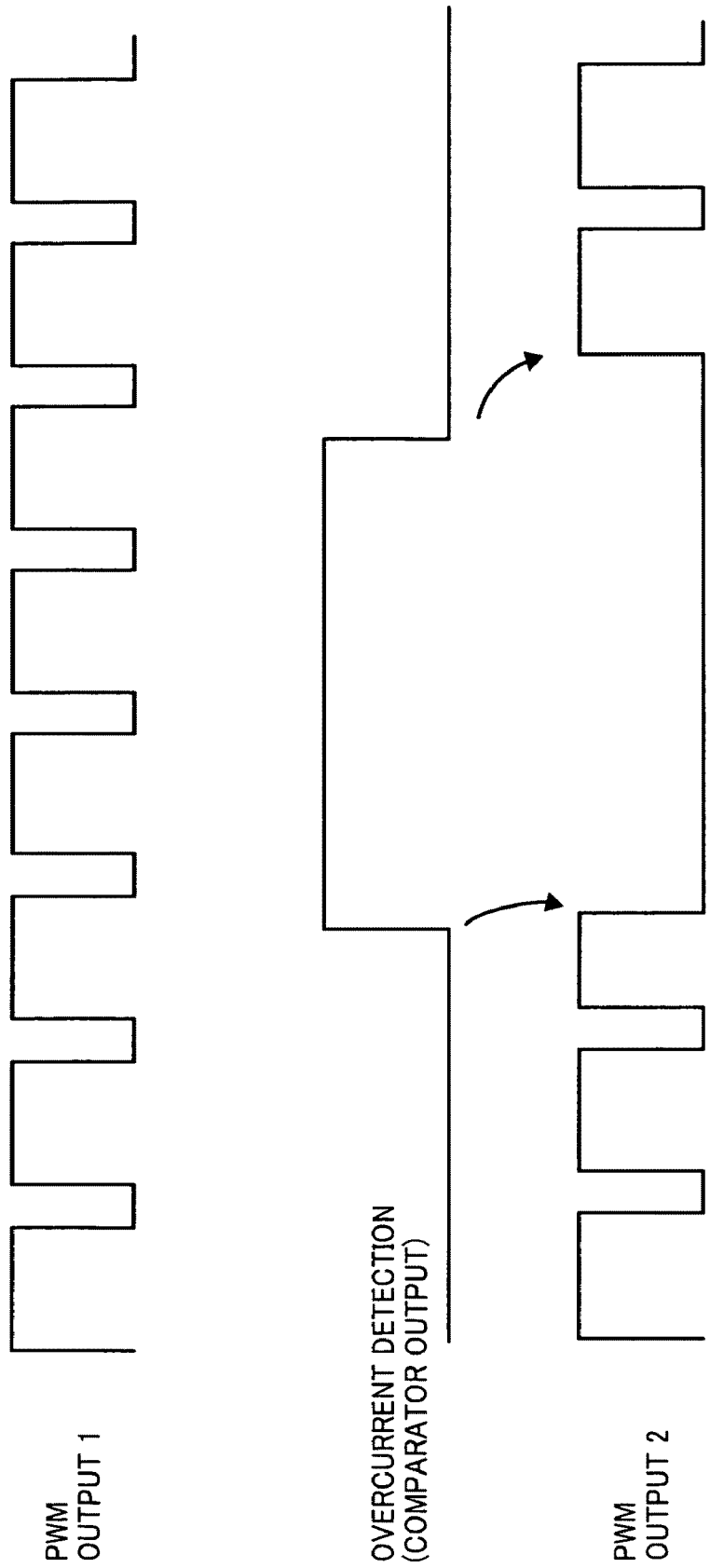
FIG. 5 is a timing chart of a pulse-width modulation (PWM) signal output from a PWM circuit of the motor control device shown in FIG. 4.

FIG. 5 is a timing chart for explaining PWM signals output from the PWM circuit 320. The PWM signal indicated at top of the timing chart is a PWM command value input from the PID control circuit 340 (see a PWM output 1). When the comparator 332 detects an overcurrent, a signal output from the comparator 332 (a comparator output) is turned ON. As a result, the PWM signal output from the PWM circuit 320 is turned OFF (see a PWM output 2). In this manner, the output is limited to prevent the overcurrent. When a drive current drops below the reference value, the comparator output is turned OFF, and the PWM signal is output from a next period.

Figure 6:
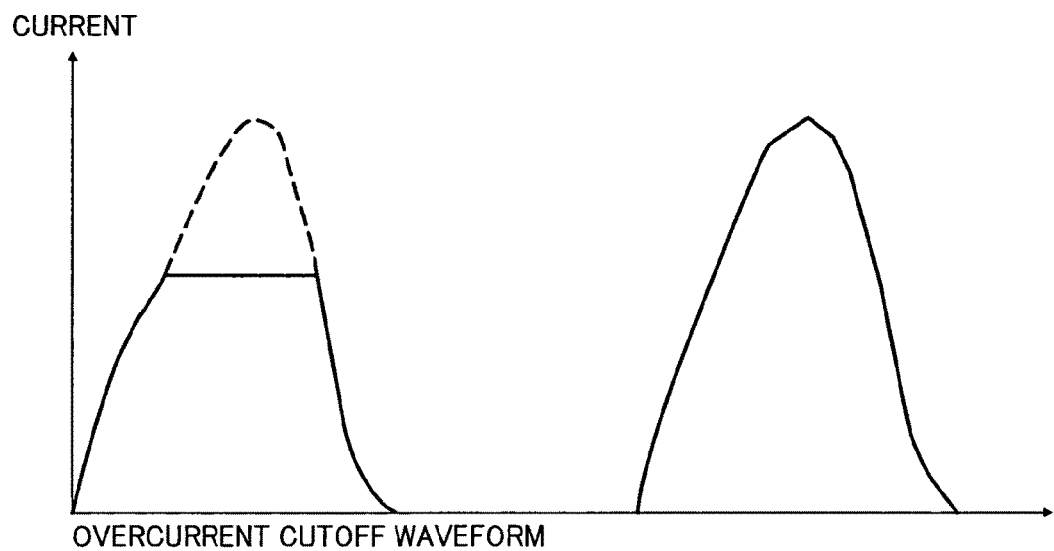
FIG. 6 is a graph showing an example of a current waveform of a drive current applied to a driver of the motor control device shown in FIG. 4.

FIG. 6 is a graph showing an example of a current waveform of a drive current applied to the driver 330. In the motor control device 300, even when a PWM command value to be expressed by a right-side current waveform is input from the PID control circuit 340, a current exceeding the reference value is cut off as shown in a left-side current waveform (an overcurrent cutoff waveform).

On the other hand, in the motor control device 200 according to the first embodiment, although the driver 130 does not include such an element capable of detecting an overcurrent as a comparator, a PWM signal for controlling an overcurrent to be prevented in the current limit PWM circuit 120 is output, so that the driver 130 can be protected from the overcurrent.

Figure 7:
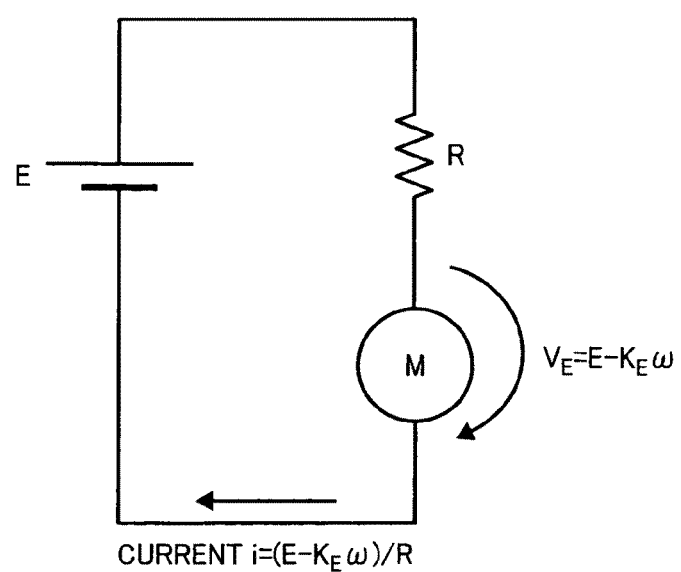
FIG. 7 is a circuit diagram for explaining a principle of a motor used in the embodiments.

FIG. 7 is a circuit diagram for explaining a principle of the motor used in the embodiments. In general, as a rotation velocity of the motor increases, a current applied to the motor decreases. This is because an induced voltage is generated in the motor in accordance with the rotation of the motor. When an induction coefficient is referred to as "$K_E$", and the rotation velocity of the motor is referred to as "$\omega$", the induced voltage is denoted by "$K_E\omega$". The current flowing into the motor can be calculated by Equation shown in a lower part of FIG. 7. In an initial state in which the motor is not driven to rotate, the rotation velocity of the motor is zero ($\omega=0$), so that a PWM signal for controlling a voltage (an initial voltage) to be equal to the product of an electric resistance R of a coil 211 and the current limit is output, and thereby driving the motor.

Figure 8:
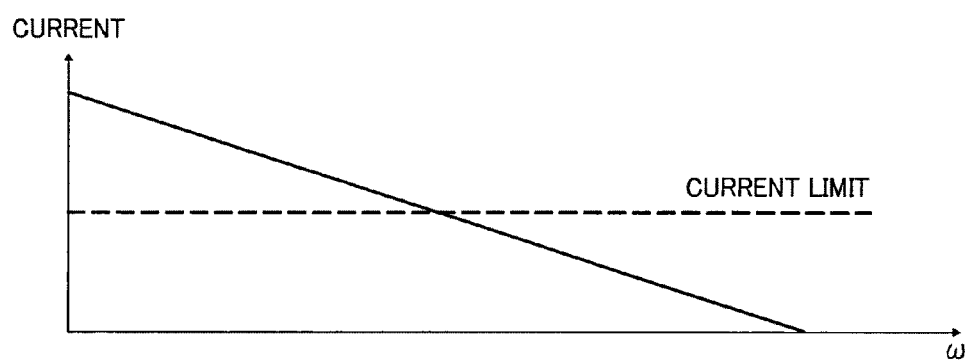
FIG. 8 is a graph showing a relationship between a rotation velocity of a motor and a current applied to a driver shown in FIG. 3.

FIG. 8 is a graph showing a relationship between a rotation velocity of the motor and a current flowing into the driver 130. As shown in the graph, the current linearly decreases as the rotation velocity increases. Actually, as the number of revolutions of the motor increases, the efficiency decreases due to a loss in a motor core and the like, and then the number of revolutions is kept constant at a certain level. Just after the motor is driven, the rotation velocity of the motor is low, so that a current exceeds the current limit. Therefore, it is necessary to control a PWM signal so that the current is limited to prevent an overcurrent.

In the first embodiment, the rotation velocity of the motor is detected based on an FG signal output from the FG 213, and a current flowing into the driver 130 is calculated with Equation shown in FIG. 7. The PWM signal is controlled so that the calculated current is kept below the current limit.

Figure 9:
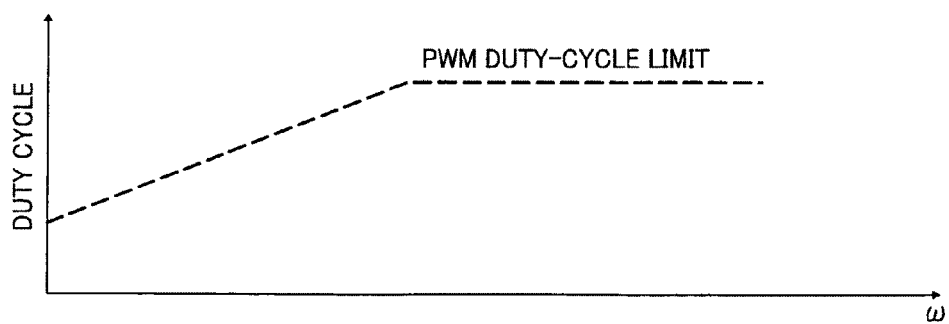
FIG. 9 is a graph for explaining a PWM duty-cycle limit.

FIG. 9 is a graph for explaining a PWM duty-cycle limit output from the current limit PWM circuit 120. The PWM duty-cycle limit is a duty cycle of a PWM output value that is controlled to be reduced by a predetermined amount so that a current corresponding to the PWM command value does not exceed the predetermined current limit. When the number of revolutions of the motor is small, a current is large, so that a difference between the current and the current limit is also large (see FIG. 8). Therefore, the number of controls for reducing the duty cycle by the predetermined amount increases. As a result, the PWM duty-cycle limit to be output decreases. As the number of revolutions of the motor increases, a current decreases, so that a difference between the current and the current limit decreases (see FIG. 8). Therefore, the number of controls for reducing the duty cycle by the predetermined amount decreases. As a result, the PWM duty-cycle limit to be output increases. After the rotation velocity of the motor reaches a certain level, a current decreases, i.e., there is no chance that a current exceeds the current limit. The duty cycle remains substantially constant. Actually, the duty cycle changes due to the control of the rotation velocity of the motor. However, in the graph shown in FIG. 9, the duty cycle is illustrated as constant for simplicity.

Figure 10:
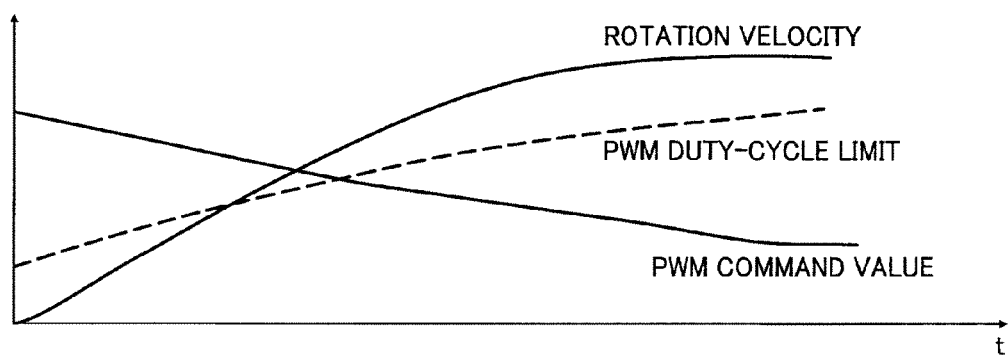
FIG. 10 is a graph for explaining changes in the rotation velocity, the PWM duty-cycle limit, and a PWM command value with time.
Figure 11:
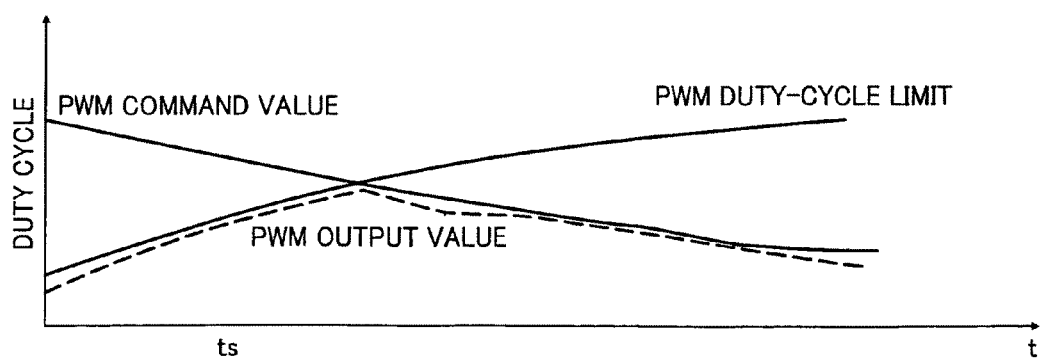
FIG. 11 is a graph for explaining a relationship of a PWM output value to be actually output with respect to the PWM command value and the PWM duty-cycle limit.

FIG. 10 is a graph for explaining changes in the rotation velocity, the PWM duty-cycle limit, and the PWM command value with respect to an elapsed time from a start-up time of the motor. FIG. 11 is a graph for explaining a relationship of a PWM output value to be actually output with respect to the PWM command value and the PWM duty-cycle limit.

As shown in FIGS. 10 and 11, just after the motor start-up, the PID control circuit 140 specifying a torque outputs a relatively-large PWM command value because a difference between the rotation velocity of the motor and a target velocity is large. On the other hand, the PWM duty-cycle limit just after the motor start-up is smaller than the PWM command value, so that the current limit PWM circuit 120 controls an output of a PWM signal (a PWM output value) so that a duty cycle does not exceed the PWM duty-cycle limit. As the rotation velocity of the motor increases, the PWM command value gradually decreases. After that, when the rotation velocity of the motor reaches the certain level, the PWM output value to be actually output is switched from the PWM duty-cycle limit to the PWM command value specified by the PID control circuit 140.

Figure 12:
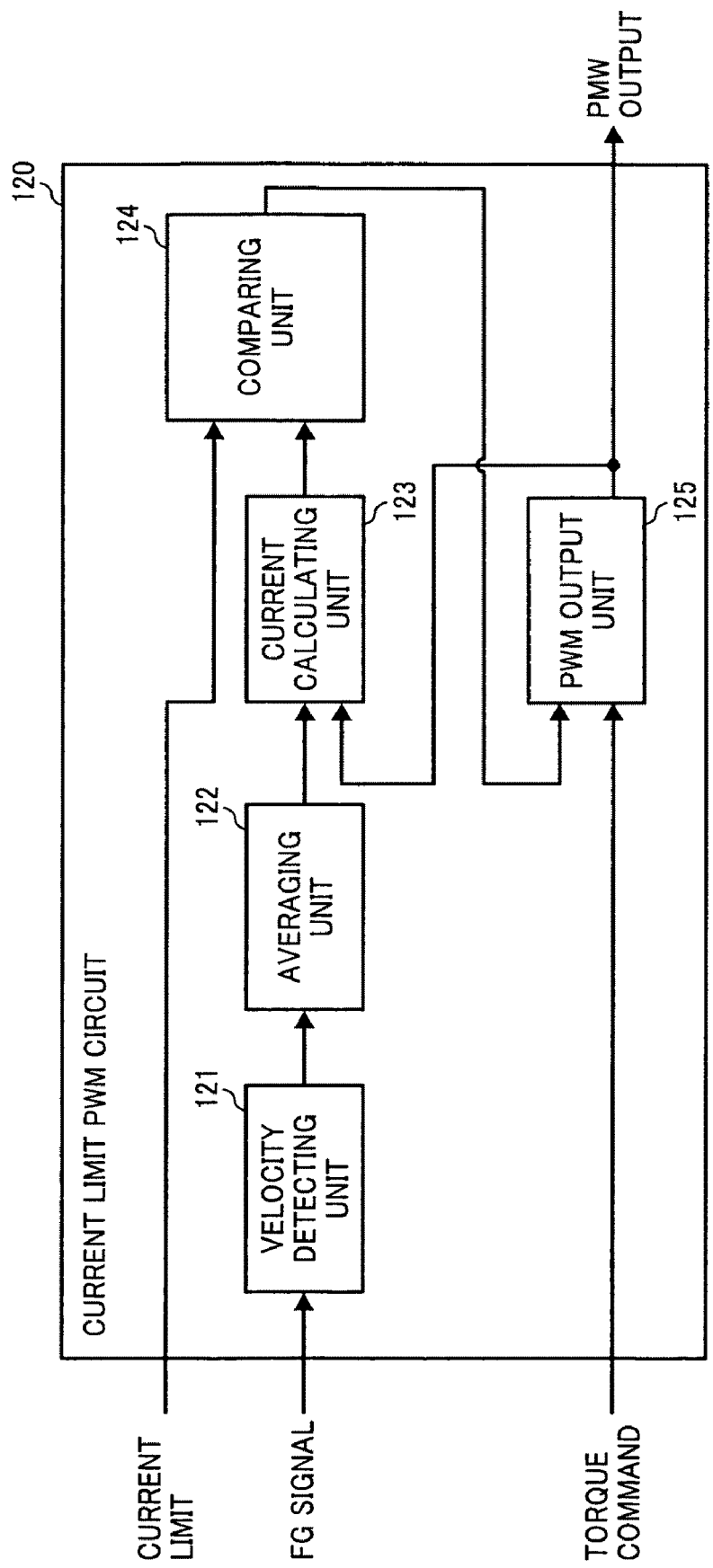
FIG. 12 is a block diagram of a current limit PWM circuit shown in FIG. 3.

Subsequently, the current limit PWM circuit 120 that controls the PWM output value is explained in detail below. FIG. 12 is a block diagram of the current limit PWM circuit 120. As shown in FIG. 12, the current limit PWM circuit 120 includes a velocity detecting unit 121, an averaging unit 122, a current calculating unit 123, a comparing unit 124, and a PWM output unit 125.

The velocity detecting unit 121 receives an FG signal from the FG 213, and detects a rotation velocity of the main motor 25 based on an interval of the FG signals (an FG cycle).

The averaging unit 122 calculates an average rotation velocity of rotation velocities detected by the velocity detecting unit 121 within a predetermined time. Specifically, the averaging unit 122 calculates an average rotation velocity of rotation velocities detected within a time until the number of pulses of the PWM signal reaches the predetermined number.

The current calculating unit 123 calculates a current based on the average rotation velocity calculated by the averaging unit 122 and the currently-output PWM output value with Equation shown in FIG. 7.

The comparing unit 124 compares the current calculated by the current calculating unit 123 with the predetermined current limit.

Based on a result of the comparison by the comparing unit 124, when the calculated current is larger than the current limit, the PWM output unit 125 outputs a PWM signal causing a decrease of a voltage used at the time of calculating the current. Specifically, when the calculated current exceeds the current limit, the PWM output unit 125 outputs a PWM signal causing a decrease of the duty cycle by the predetermined amount.

Figure 13:
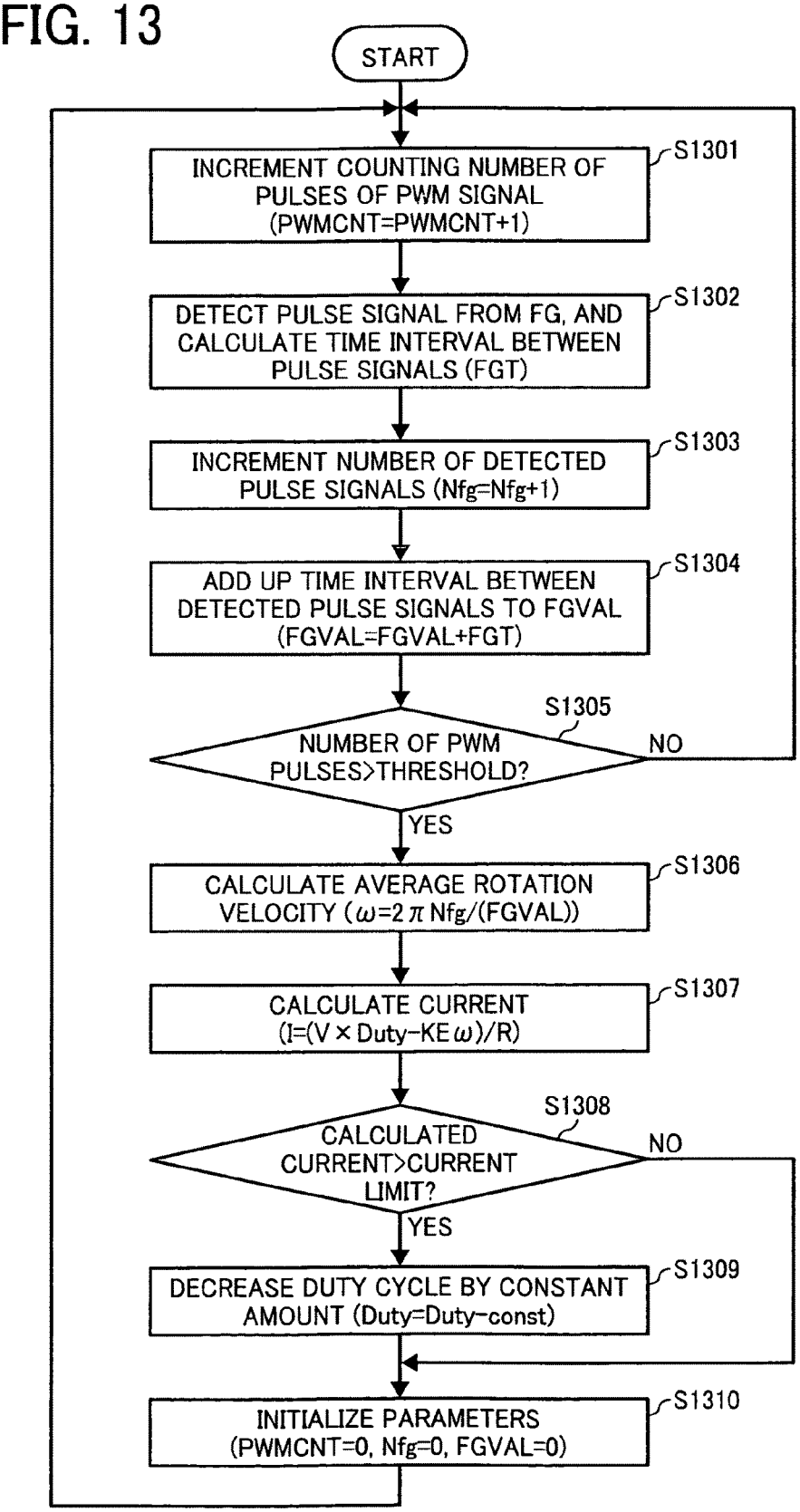
FIG. 13 is a flowchart of a current limiting process performed by the motor control device shown in FIG. 3.

Subsequently, a current limiting process performed by the motor control device 200 is explained below. FIG. 13 is a flowchart of the current limiting process performed by the motor control device 200 according to the first embodiment.

First, the current limit PWM circuit 120 increments the counting number of pulses of a PWM signal (Step S1301). A counter unit for counting the number of pulses of the PWM signal is referred to as "PWMCNT". The PWMCNT is incremented by one.

Then, the velocity detecting unit 121 detects a pulse signal from the FG 213 (an FG signal), and calculates a time interval between pulse signals (Step S1302), and increments the number of detected pulse signals by one (Step S1303). The time interval between pulse signals is referred to as "FGT", and a counter unit for counting the number of detected pulse signals is referred to as "Nfg". The Nfg is incremented by one.

The velocity detecting unit 121 counts up the time interval between the detected pulse signals (Step S1304). The time interval between the detected pulse signals is referred to as "FGVAL". The velocity detecting unit 121 adds up the FGVAL.

The current limit PWM circuit 120 determines whether the PWMCNT exceeds a threshold (Step S1305). If the PWMCNT does not exceed the threshold (NO at Step S1305), the process control returns to Step S1301.

If the PWMCNT exceeds the threshold (YES at Step S1305), the averaging unit 122 calculates an average rotation velocity based on the FGVAL (Step S1306). Specifically, the averaging unit 122 calculates an average rotation velocity with Equation (1).

$$\omega = 2\pi Nfg/(FGVAL) \quad (1)$$

The current calculating unit 123 calculates a drive current flowing into the driver 130 based on the average rotation velocity, a duty cycle of a currently-received PWM signal (Duty), a power supply voltage (V) of the driver 130, a resistance (R) of the driver 130, and an induction coefficient $K_E$ (Step S1307). Specifically, the current calculating unit 123 calculates the drive current with Equation (2).

$$I = (V \times \text{Duty} - K_E \omega)/R \quad (2)$$

The comparing unit 124 determines whether the calculated current is larger than a predetermined current limit (Step S1308). If the calculated current is larger than the current limit (YES at Step S1308), the PWM output unit 125 outputs a PWM signal causing a decrease of the duty cycle by a predetermined amount (const) (Step S1309). Alternatively, the PWM signal can be turned OFF instead of the decrease of the duty cycle by the predetermined amount.

The current limit PWM circuit 120 initializes the PWMCNT, the Nfg, and the FGVAL to zero (Step S1310), and the process control returns to Step S1301.

In this manner, in the motor control device 200 according to the first embodiment, a current flowing into the driver 130 is calculated based on a rotation velocity of the main motor 25 calculated based on an FG signal, so that a PWM signal can be controlled that a current does not exceed the current limit in the current limit PWM circuit 120. Therefore, although no comparator is provided to the driver 130, it is possible to protect the driver 130 from an overcurrent.

Subsequently, the motor control device 200 according to a modification of the first embodiment is explained below. The motor control device 200 according to the modification of the first embodiment includes a current limit PWM circuit 1420 instead of the current limit PWM circuit 120. In the current limit PWM circuit 120, a PWM signal is controlled depending on a current calculated based on a rotation velocity of the motor. In the current limit PWM circuit 1420, it is configured to output a PWM signal enabling to avoid an overcurrent depending on a rotation velocity of the motor based on a conversion table in which a duty cycle of a PWM signal is defined in advance to be associated with a rotation velocity of the motor.

Figure 14:
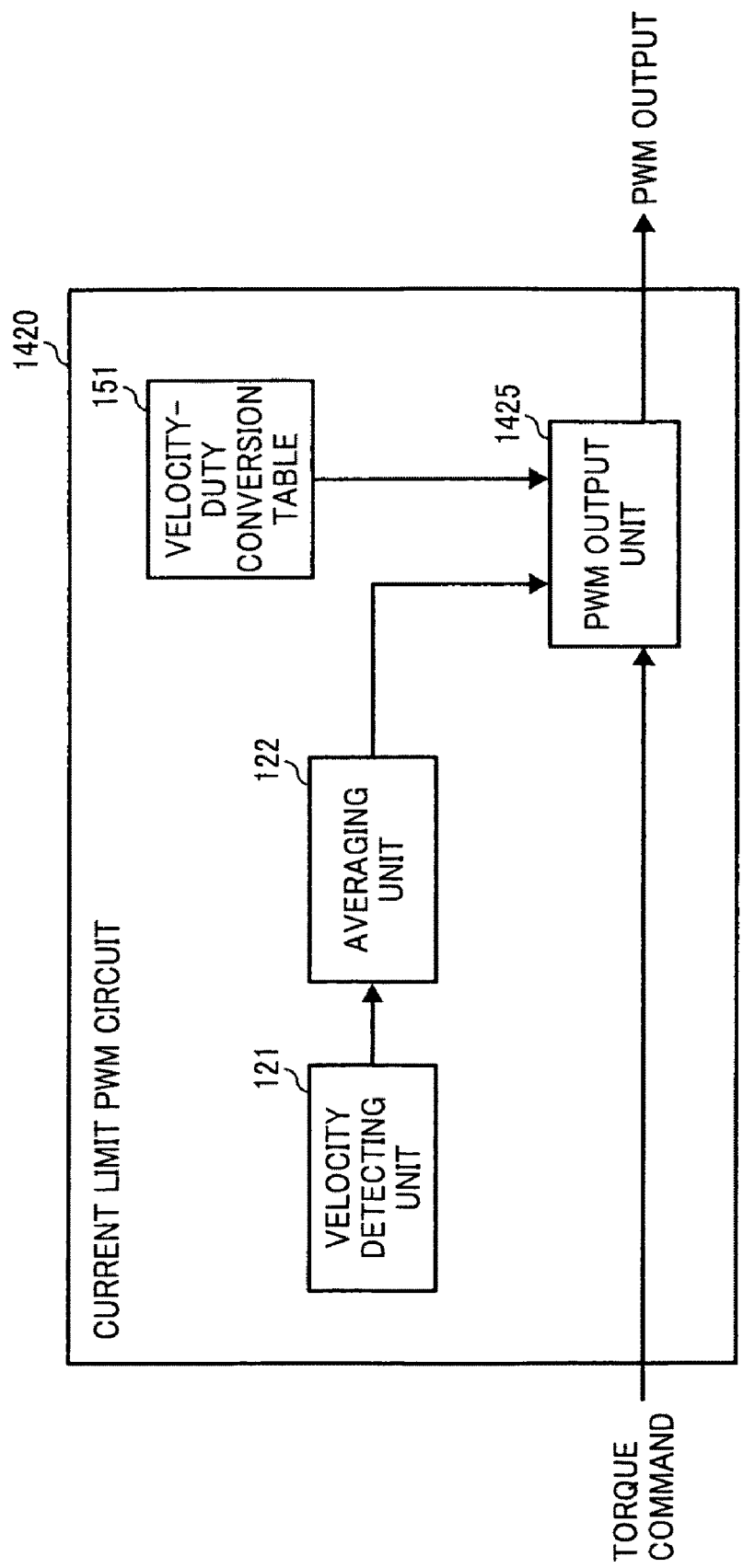
FIG. 14 is a block diagram of a current limit PWM circuit included in a motor control device according to a modification of the first embodiment.

FIG. 14 is a block diagram of the current limit PWM circuit 1420. As shown in FIG. 14, the current limit PWM circuit 1420 includes a velocity-duty conversion table 151, the velocity detecting unit 121, the averaging unit 122, and a PWM output unit 1425. The portions identical to those in FIG. 12 are denoted with the same reference numerals, and the description of those portions is omitted.

The velocity-duty conversion table 151 is a storing unit that stores therein a rotation velocity of the main motor 25 and a duty cycle of a PWM signal enabling to control a current to be below the current limit in an associated manner.

The PWM output unit 1425 acquires a duty cycle of a PWM signal corresponding to an average rotation velocity calculated by the averaging unit 122 from the velocity-duty conversion table 151, and outputs the acquired duty cycle to the driver 130.

Figure 15:
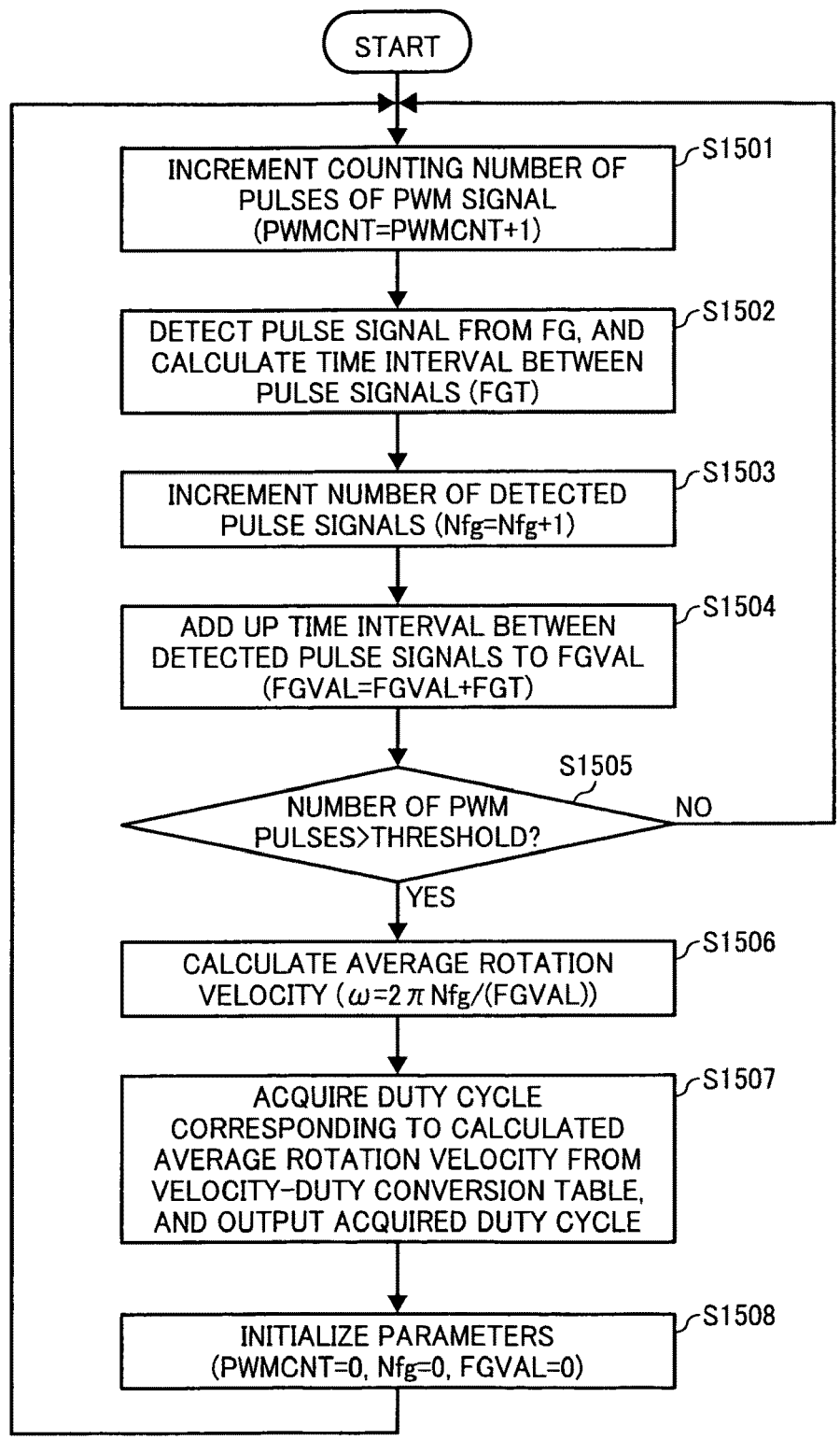
FIG. 15 is a flowchart of a current limiting process performed by the motor control device according to the modification of the first embodiment.

Subsequently, a current limiting process performed by the motor control device 200 according to the modification of the first embodiment is explained below. FIG. 15 is a flowchart of the current limiting process performed by the motor control device 200 according to the modification of the first embodiment.

The portions at Steps S1501 to S1506 are identical to those at Steps S1301 to S1306 in FIG. 13, and the description of those portions is omitted.

After the calculation of the average rotation velocity, the PWM output unit 1425 acquires a duty cycle corresponding to the calculated average rotation velocity from the velocity-duty conversion table 151, and outputs the acquired duty cycle to the driver 130 (Step S1507). The portion at Step S1508 is identical to that is at Step S1310 in FIG. 13, and the description of the portion is omitted.

As described above, with the velocity-duty conversion table 151, a PWM signal can be controlled depending on a rotation velocity of the motor, so that the driver 130 can be protected from an overcurrent. In addition, in the motor control device 200 according to the modification of the first embodiment, the current calculating unit 123 and the comparing unit 124 need not to be included in the current limit PWM circuit 1420, so that a circuit configuration of the current limit PWM circuit 1420 can be simplified.

In this manner, the motor control device 200 according to the modification of the first embodiment can control a PWM signal so that a current flowing into the driver does not exceed the current limit. Therefore, it is possible to limit a current flowing into the driver without any element for detecting an overcurrent, such as a comparator.

In the first embodiment, just after the motor start-up, a PWM signal is controlled to protect the driver from an overcurrent. Therefore, a starting torque is required at the time of the motor start-up, so that a required torque becomes higher than usual in most cases. However, if such a torque up due to the motor start-up takes only a short while, and also if a heat generation of the driver is within an allowable range even when a current exceeds the current limit by a certain degree, it is possible to flow the high current into the driver. A motor control device according to a second embodiment of the present invention is configured to control a higher current for a predetermined time period just after the motor start-up to obtain the required torque.

Figure 16:
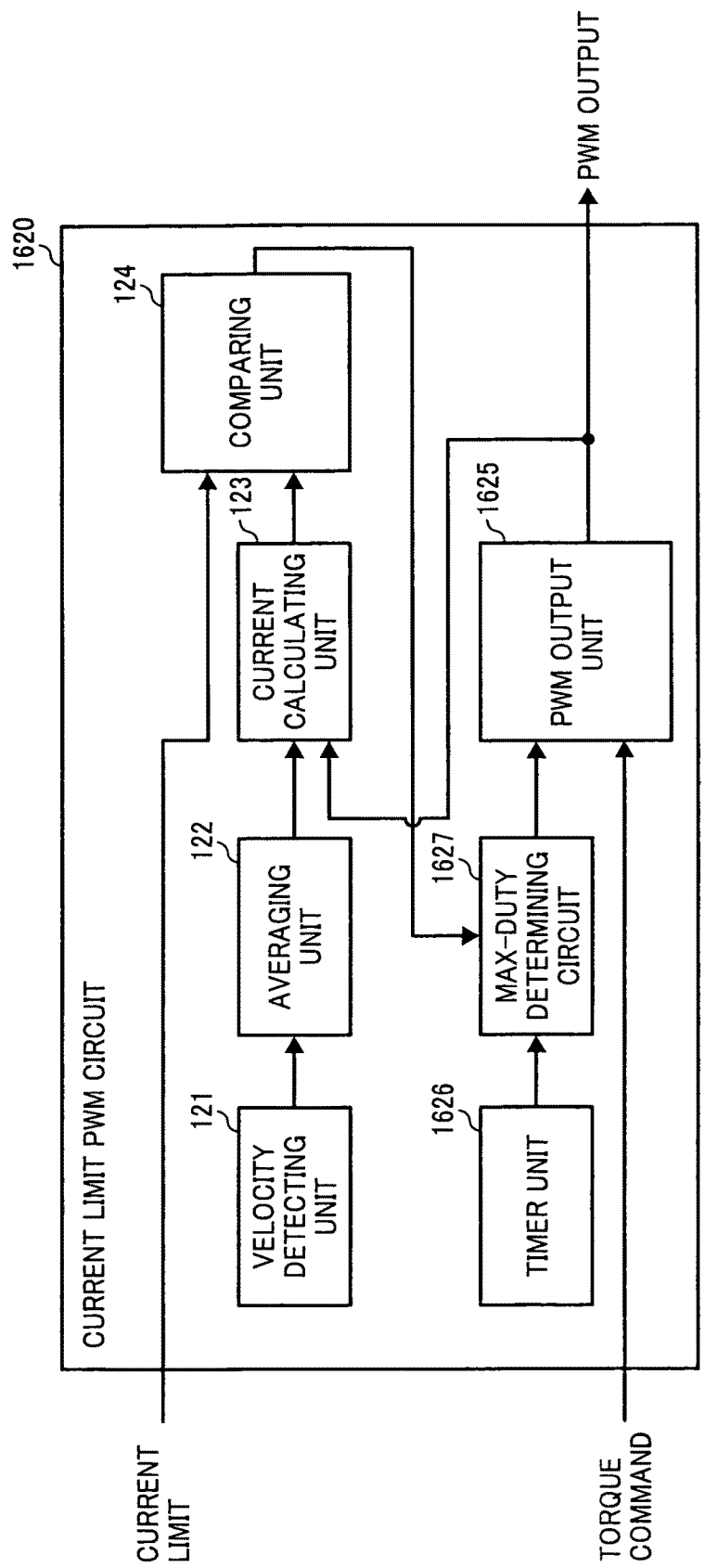
FIG. 16 is a block diagram of a current limit PWM circuit included in a motor control device according to a second embodiment of the present invention.

FIG. 16 is a block diagram of a current limit PWM circuit 1620 included in the motor control device according to the second embodiment. As shown in FIG. 16, the current limit PWM circuit 1620 includes the velocity detecting unit 121, the averaging unit 122, the current calculating unit 123, the comparing unit 124, a PWM output unit 1625, a timer unit 1626, and a max-duty determining unit 1627. The portions identical to those in FIG. 12 are denoted with the same reference numerals, and the description of those portions is omitted.

The timer unit 1626 measures a time. The max-duty determining unit 1627 determines to output a predetermined initial value as a duty cycle of a PWM signal from a start-up time of the motor (an initial time) to a predetermined time "ts" based on the time measured by the timer unit 1626.

By the time ts, the PWM output unit 1625 outputs the initial value determined by the max-duty determining unit 1627 as a PWM output value. After the time ts, in the same manner as the first embodiment, the PWM output unit 1625 calculates a PWM output value based on a rotation velocity of the motor, and outputs the calculated PWM output value.

Figure 17:
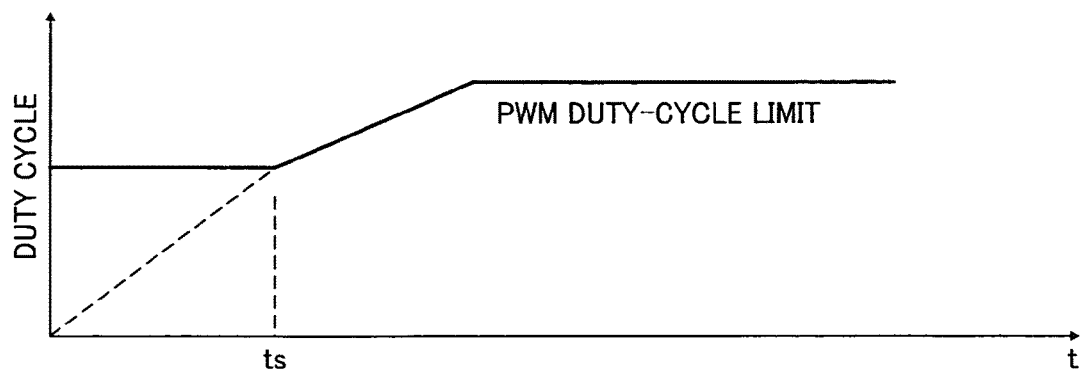
FIG. 17 is a graph for explaining an example of a duty cycle of a PWM signal output from the current limit PWM circuit shown in FIG. 16.

FIG. 17 is a graph for explaining an example of a duty cycle of a PWM signal output from the current limit PWM circuit 1620. From the initial time to the time ts, a duty cycle is set to the initial value to obtain a starting torque. After the time ts, in the same manner as the first embodiment, when the rotation velocity of the motor reaches a certain level, a PWM duty-cycle limit is output as a PWM output value.

Figure 18:
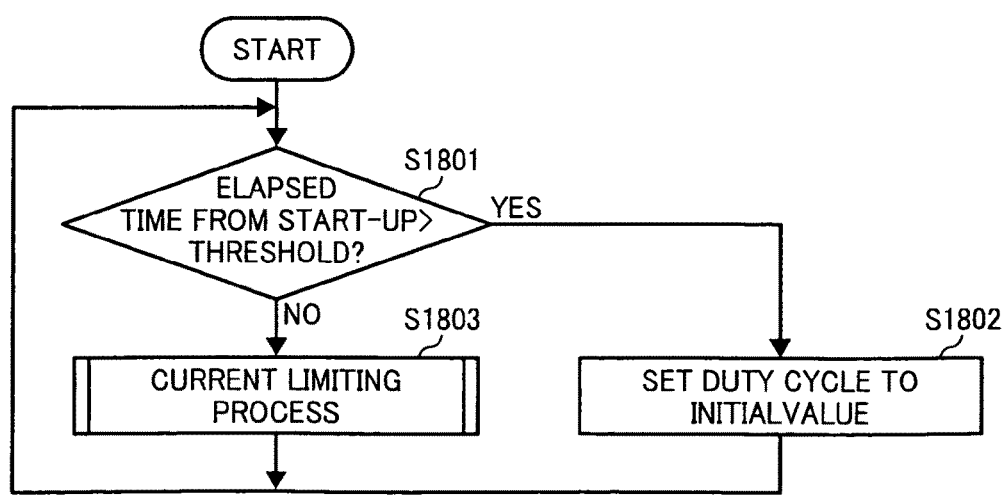
FIG. 18 is a flowchart of a duty-cycle determining process performed by the motor control device according to the second embodiment.

Subsequently, a duty-cycle determining process performed by the current limit PWM circuit 1620 is explained below. FIG. 18 is a flowchart of the duty-cycle determining process performed by the current limit PWM circuit 1620.

The max-duty determining unit 1627 determines whether an elapsed time from the initial time is smaller than a threshold (the time ts) based on an output from the timer unit 1626 (Step S1801). If the elapsed time is smaller than the threshold (YES at Step S1801), the max-duty determining unit 1627 sets a duty cycle to the initial value (Step S1802). The PWM output unit 1625 outputs a PWM signal indicating a duty cycle corresponding to the initial value to the driver 130.

If the elapsed time is larger than the threshold (NO at Step S1801), a current limiting process for limiting a duty cycle of a PWM signal depending on a rotation velocity of the motor is performed (Step S1803). The current limiting process is performed with any of the procedures shown in FIGS. 13 and 15.

In this manner, in the motor control device according to the second embodiment, a higher current can be controlled for a predetermined time period just after the motor start-up. Therefore, it is possible to obtain a required torque at the time of the motor start-up properly, and thus it is possible to bring a rotation velocity of the motor to a target velocity quickly.

In the second embodiment, to minimize a delay of a mechanical rise of the motor, a duty cycle is set to a larger level for a predetermined time period after the motor start-up. If such a duty cycle limit can be adjusted step-by-step, it is possible to achieve a starting torque up more efficiently. Therefore, in a motor control device according to a third embodiment of the present invention, with due consideration of a current rise time (an electrical time constant) just after the motor start-up, a current is controlled to be higher than that is in the second embodiment for a predetermined time period just after the motor start-up.

Figure 19:
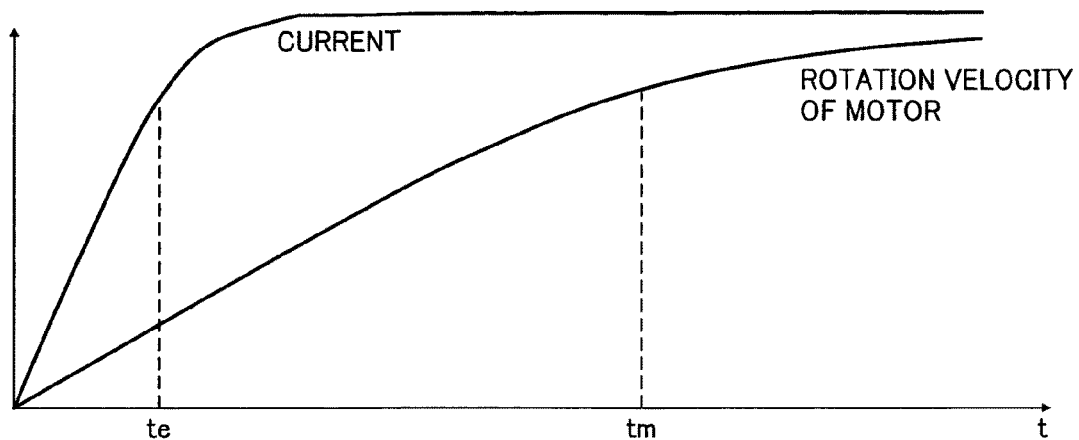
FIG. 19 is a graph for explaining a relationship between a rise of a current and a rise of a rotation velocity of the motor.

FIG. 19 is a graph for explaining a relationship between a rise of a current and a rise of a rotation velocity of the motor after the motor start-up. As shown in FIG. 19, when a voltage is applied to the motor, an electrical rise time "te" of the current is significantly shorter than a mechanical rise time "tm" of the rotation velocity of the motor in general. In the third embodiment, it is configured to change the initial value of a duty cycle of a PWM signal by each predetermined time interval in response to both of the electrical rise time te and the mechanical rise time tm.

Figure 20:
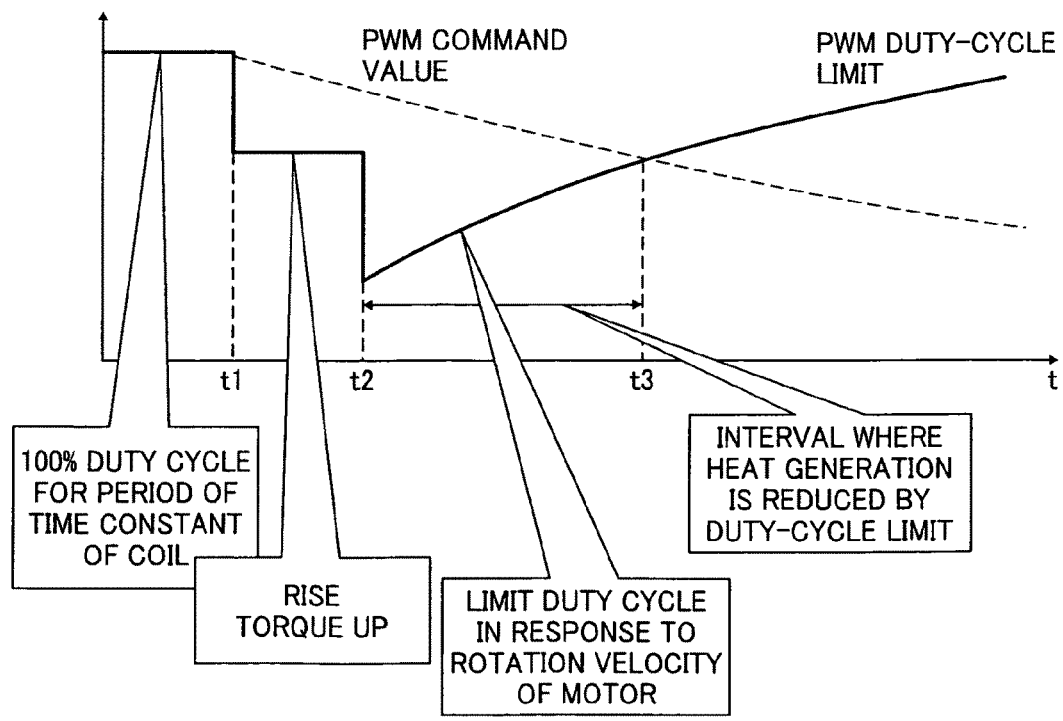
FIG. 20 is a graph for explaining an example of a duty cycle of a PWM signal output from a current limit PWM circuit of a motor control device according to a third embodiment of the present invention.

FIG. 20 is a graph for explaining an example of a duty cycle of a PWM signal output from a current limit PWM circuit of the motor control device according to the third embodiment. As shown in FIG. 20, from the motor start-up to a time "t1" corresponding to a rise delay time due to an L component of a coil, a PWM signal indicating a duty cycle of 100% is output. When the current electrically rises up, a PWM duty-cycle limit is increased for a rise torque up till a time "t2" as the mechanical rise time. After the time t2, a duty cycle is controlled to correspond to a PWM command value. Therefore, it is possible to achieve a torque up at the motor start-up, and also to reduce a heat generation in an interval between the time t2 to a time "t3".

Figure 21:
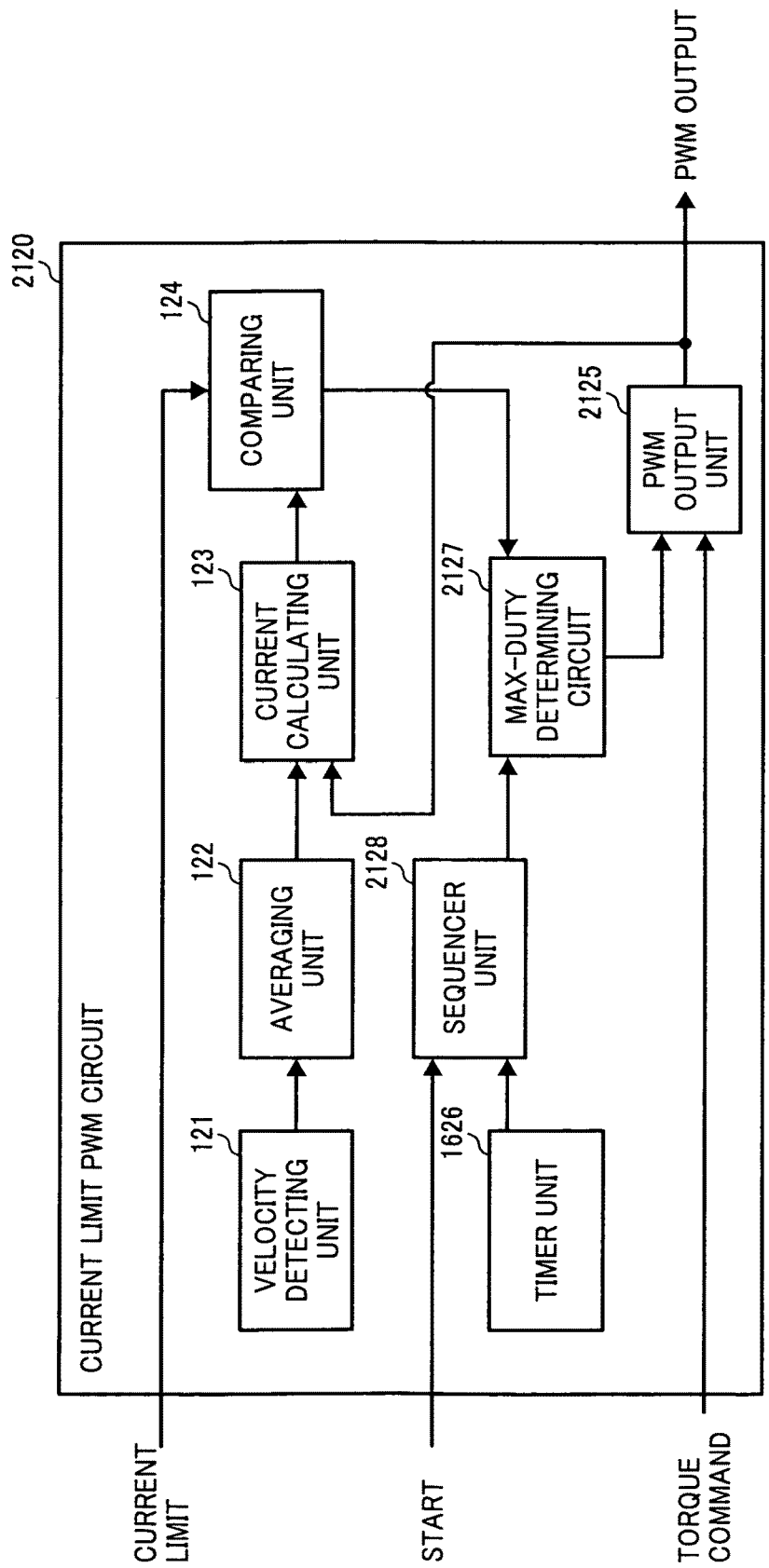
FIG. 21 is a block diagram of the current limit PWM circuit of the motor control device according to the third embodiment.

FIG. 21 is a block diagram of a current limit PWM circuit 2120 of the motor control device according to the third embodiment. As shown in FIG. 21, the current limit PWM circuit 2120 includes the velocity detecting unit 121, the averaging unit 122, the current calculating unit 123, the comparing unit 124, a PWM output unit 2125, the timer unit 1626, a max-duty determining unit 2127, and a sequencer unit 2128. The portions identical to those in FIGS. 12 and 16 are denoted with the same reference numerals, and the description of those portions is omitted.

Figure 22:
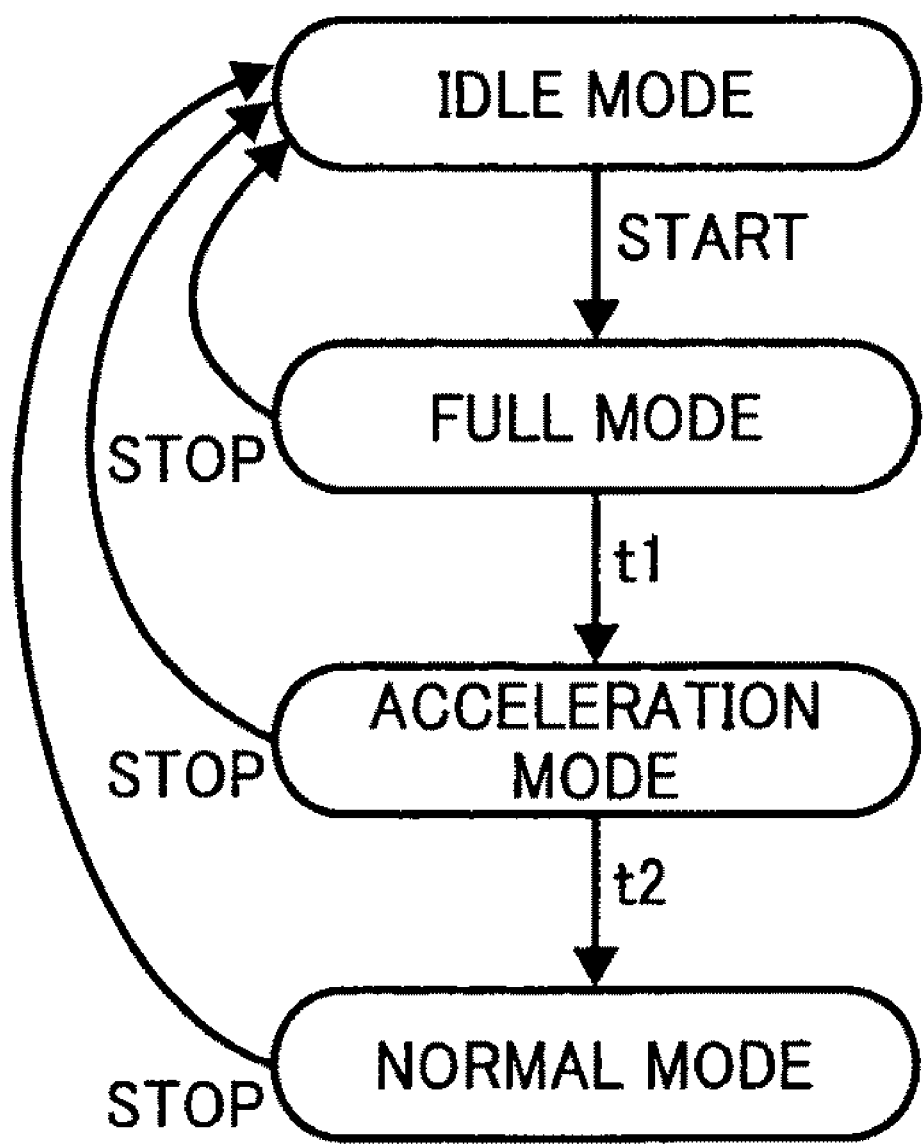
FIG. 22 is a state transition diagram of a motor operation mode.

The sequencer unit 2128 controls a motor operation mode indicating an operating state of the motor depending on an elapsed time from the motor start-up. FIG. 22 is a state transition diagram of the motor operation mode. As shown in FIG. 22, when the motor is in an initial state, i.e., when the motor is not driven to rotate, the motor operation mode is an idle mode. When the motor starts being driven, the motor operation mode changes to a full mode to maximize a duty cycle. After a lapse of the time t1, the motor operation mode changes to an acceleration mode for a torque up. Then, after a lapse of the time t2, the motor operation mode changes to a normal mode to limit a duty cycle to a normal value.

The max-duty determining unit 2127 determines a duty cycle of a PWM signal depending on the motor operation mode based on an output from the sequencer unit 2128. Specifically, the max-duty determining unit 2127 determines a value of a duty cycle as 100% in the full mode and as a predetermined initial value in the acceleration mode.

The PWM output unit 2125 outputs a PWM output value controlled based on the duty cycle determined by the max-duty determining unit 2127. Specifically, the PWM output unit 2125 outputs the duty cycle of 100% in the full mode, the duty cycle of the initial value in the acceleration mode, and the duty cycle of a value calculated based on a rotation velocity of the motor in the normal mode in the same manner as the first embodiment.

Figure 23:
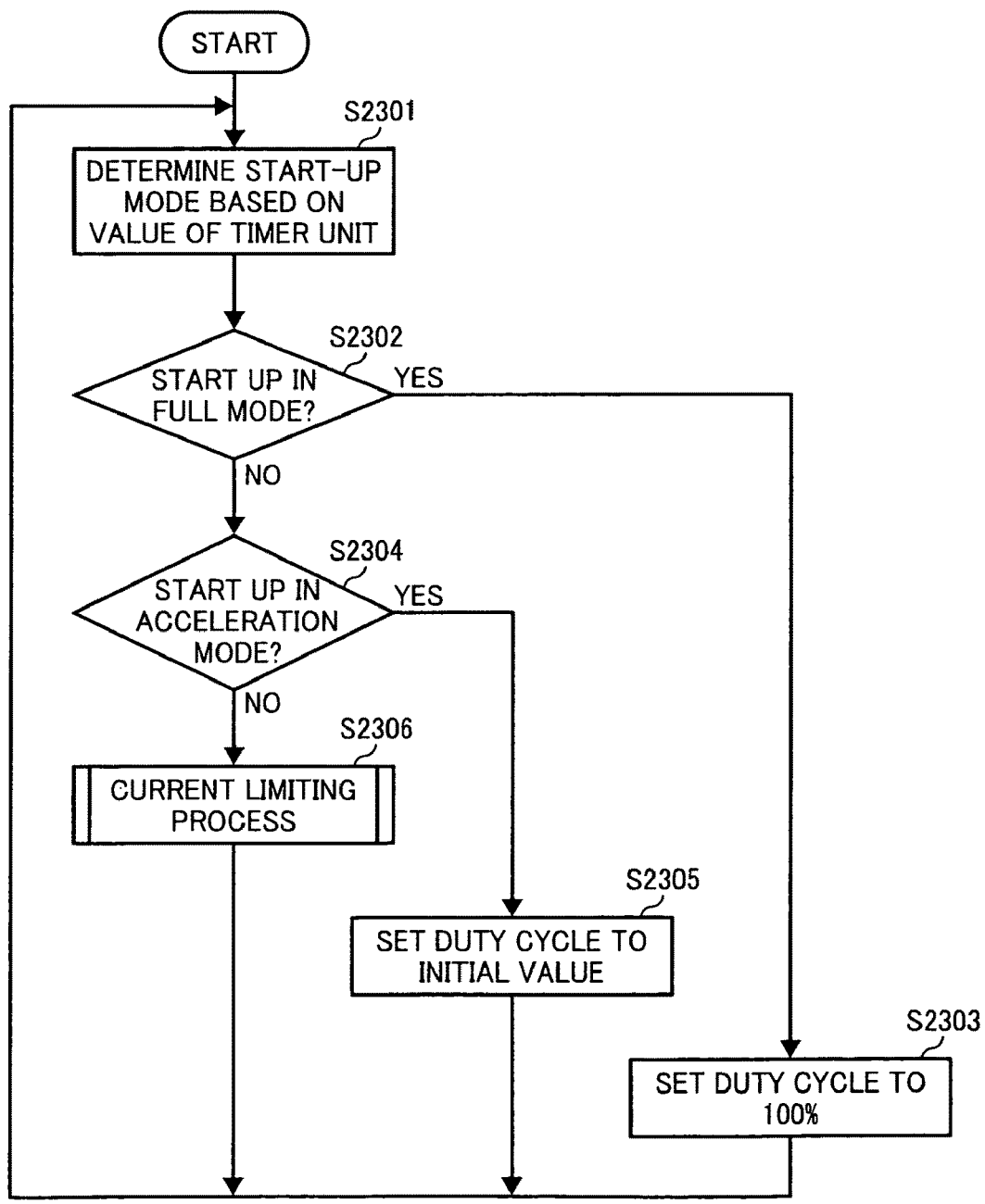
FIG. 23 is a flowchart of a duty-cycle determining process performed by the motor control device according to the third embodiment.

Subsequently, a duty-cycle determining process performed by the motor control device according to the third embodiment is explained below. FIG. 23 is a flowchart of the duty-cycle determining process.

The sequencer unit 2128 determines the motor operation mode based on a value output from the timer unit 1626 (Step S2301). The max-duty determining unit 2127 determines a duty cycle depending on the motor operation mode.

Specifically, the max-duty determining unit 2127 determines whether the motor operation mode is the full mode (Step S2302). If the motor operation mode is the full mode (YES at Step S2302), the max-duty determining unit 2127 sets up a duty cycle to 100% (Step S2303). The PWM output unit 2125 outputs a PWM signal indicating the duty cycle of 100% to the driver 130.

If the motor operation mode is not the full mode (NO at Step S2302), the max-duty determining unit 2127 further determines whether the motor operation mode is the acceleration mode (Step S2304). If the motor operation mode is the acceleration mode (YES at Step S2304), the max-duty determining unit 2127 sets up a duty cycle to a predetermined initial value (Step S2305). The initial value is determined for the torque up in the same manner as at Step S1802 in the second embodiment.

If the motor operation mode is not the acceleration mode (NO at Step S2304), a current limiting process is performed to limit a duty cycle of a PWM signal depending on a rotation velocity of the motor (Step S2306). The current limiting process can be performed with any of the procedures shown in FIGS. 13 and 15.

In this manner, in the motor control device according to the third embodiment, with due consideration of a current rise time just after the motor start-up, a PWM duty cycle for controlling a current is maximized for a predetermined time period just after the motor start-up. Therefore, it is possible to achieve the torque up at the motor start-up and also to reduce a heat generation after a lapse of the predetermined time period.

In the first to third embodiments, a pulse signal output from the FG is used as an input indicating a detection of a rotation velocity of the motor. However, the FG cannot output the pulse signal stably until the rotation velocity is kept constant. Moreover, there are some motors that include no FG, so that it is necessary to detect a rotation velocity of the motor with any other methods. A motor control device according to a fourth embodiment of the present invention detects a rotation velocity of the motor with a pulse signal output from the hall element instead of a pulse signal output from the FG.

Figure 24:
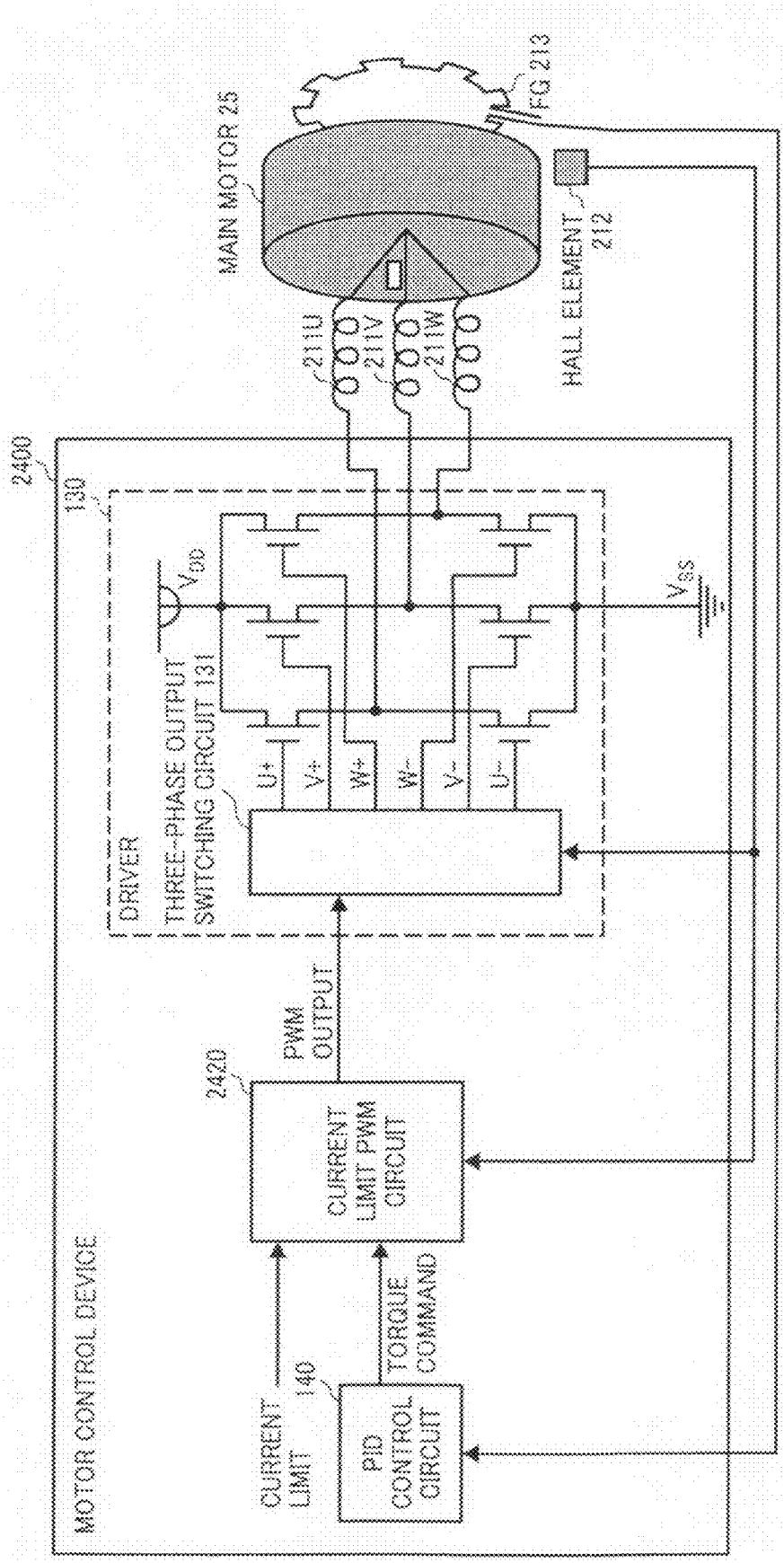
FIG. 24 is a block diagram of a motor control device according to a fourth embodiment of the present invention.

FIG. 24 is a block diagram of a motor control device 2400 according to the fourth embodiment. As shown in FIG. 24, the motor control device 2400 includes the PID control circuit 140, the driver 130, and a current limit PWM circuit 2420. The portions identical to those in FIG. 3 are denoted with the same reference numerals, and the description of those portions is omitted.

A difference between the current limit PWM circuit 2420 and the current limit PWM circuit 120 is that the current limit PWM circuit 2420 calculates a current based on not an FG signal but a pulse signal received from the hall element 212. Incidentally, the main motor 25 is a three-phase motor, so that the main motor 25 includes three numbers of the hall elements 212 corresponding to each phase, although only one number of the hall element 212 is depicted in FIG. 24. The hall elements 212 are respectively referred to as hall elements A, B, and C.

Figure 25:
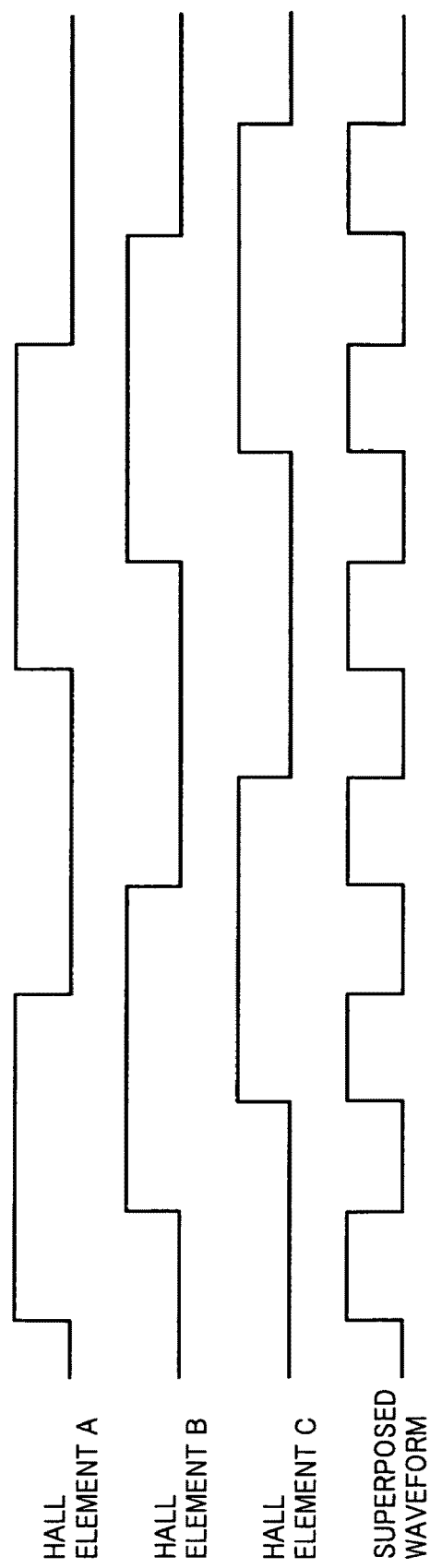
FIG. 25 is signal waveform diagrams of an example of outputs from hall elements and a superposed signal waveform.

In the fourth embodiment, the current limit PWM circuit 2420 increases the resolution by combining outputs from the hall elements A, B, and C into one. FIG. 25 is signal waveforms of an example of outputs from the hall elements A, B, and C and a superposed signal waveform. As shown in FIG. 25, an exclusive OR operation is applied to the signal waveforms of the outputs from the hall elements A, B, and C, and thereby obtaining the superposed signal waveform. The velocity detecting unit 121 included in the current limit PWM circuit 2420 detects a rotation velocity of the motor based on the superposed signal waveform. A controlling process of a PWM signal to be performed after the velocity detecting unit 121 detects the rotation velocity is identical to that is explained in the first embodiment, and the description of the process is omitted.

In this manner, in the motor control device according to the fourth embodiment, a rotation velocity of the motor can be detected based on pulse signals output from the hall elements. Therefore, it is possible to control the motor even if the motor includes no FG, and also to control such a motor that does not use an FG incapable of outputting an FG signal stably sometimes.

In the first to fourth embodiments, a time interval between pulses of a signal input from the FG or the hall element is measured to detect a rotation velocity of the motor. The rotation velocity is proportional to an inverse of the time interval between the input pulses, so that a value of a result of the measurement is excessively large when the rotation velocity is low (for example, at the time of the motor start-up), and thus an overflow of the counter unit may occur. On the other hand, when the rotation velocity is high, a value of a result of the measurement is excessively small, and thus the resolution of the measurement decreases. A motor control device according to a fifth embodiment of the present invention is configured to change a count-up clock depending on a change in a time length between pulses at the time of the measurement of the rotation velocity.

Figure 26:
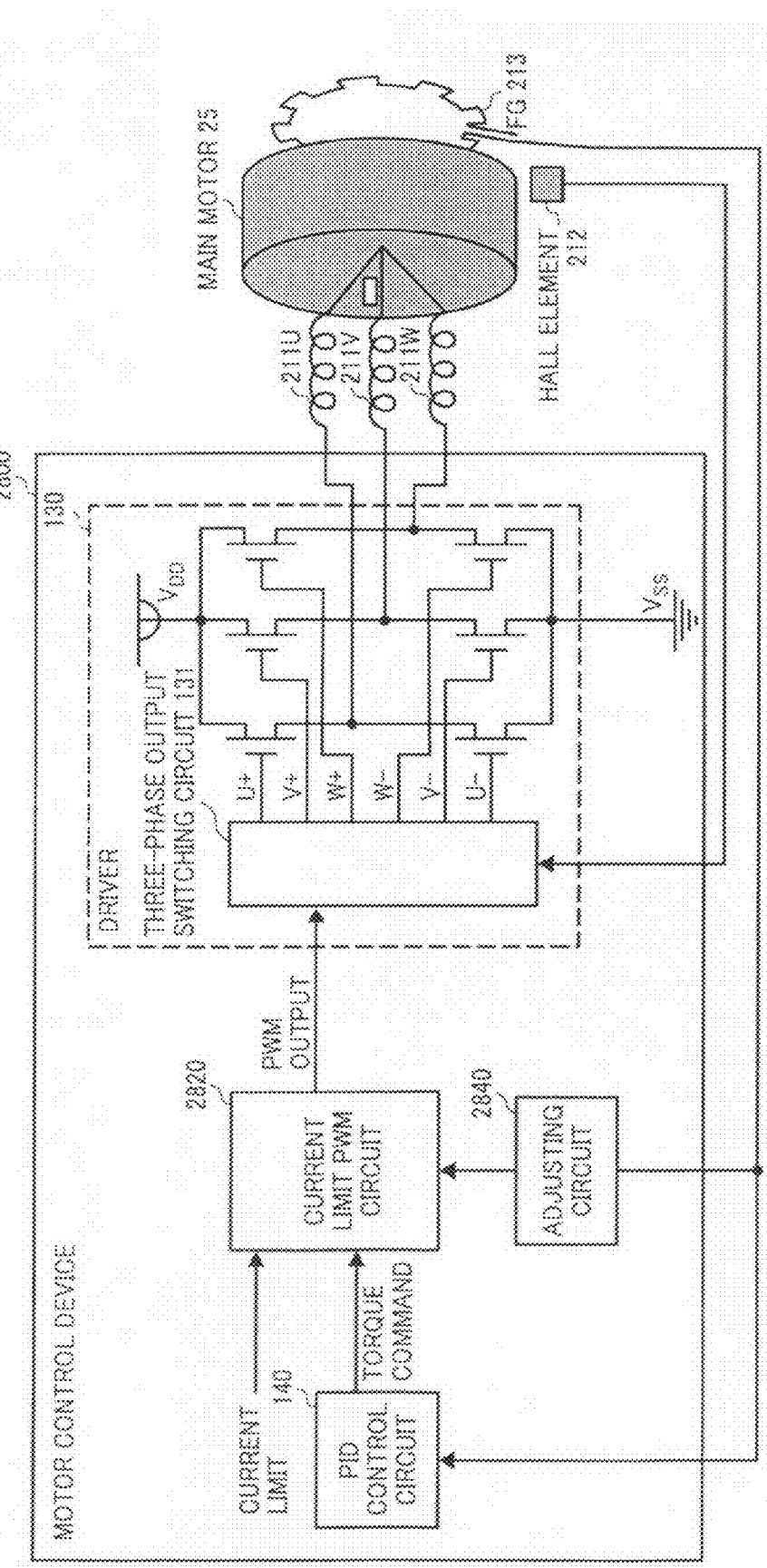
FIG. 26 is a block diagram of a motor control device according to a fifth embodiment of the present invention.

FIG. 26 is a block diagram of a motor control device 2800 according to the fifth embodiment. As shown in FIG. 26, the motor control device 2800 includes the PID control circuit 140, the driver 130, a current limit PWM circuit 2820, and an adjusting circuit 2840. The portions identical to those in FIG. 3 are denoted with the same reference numerals, and the description of those portions is omitted.

Figure 27:
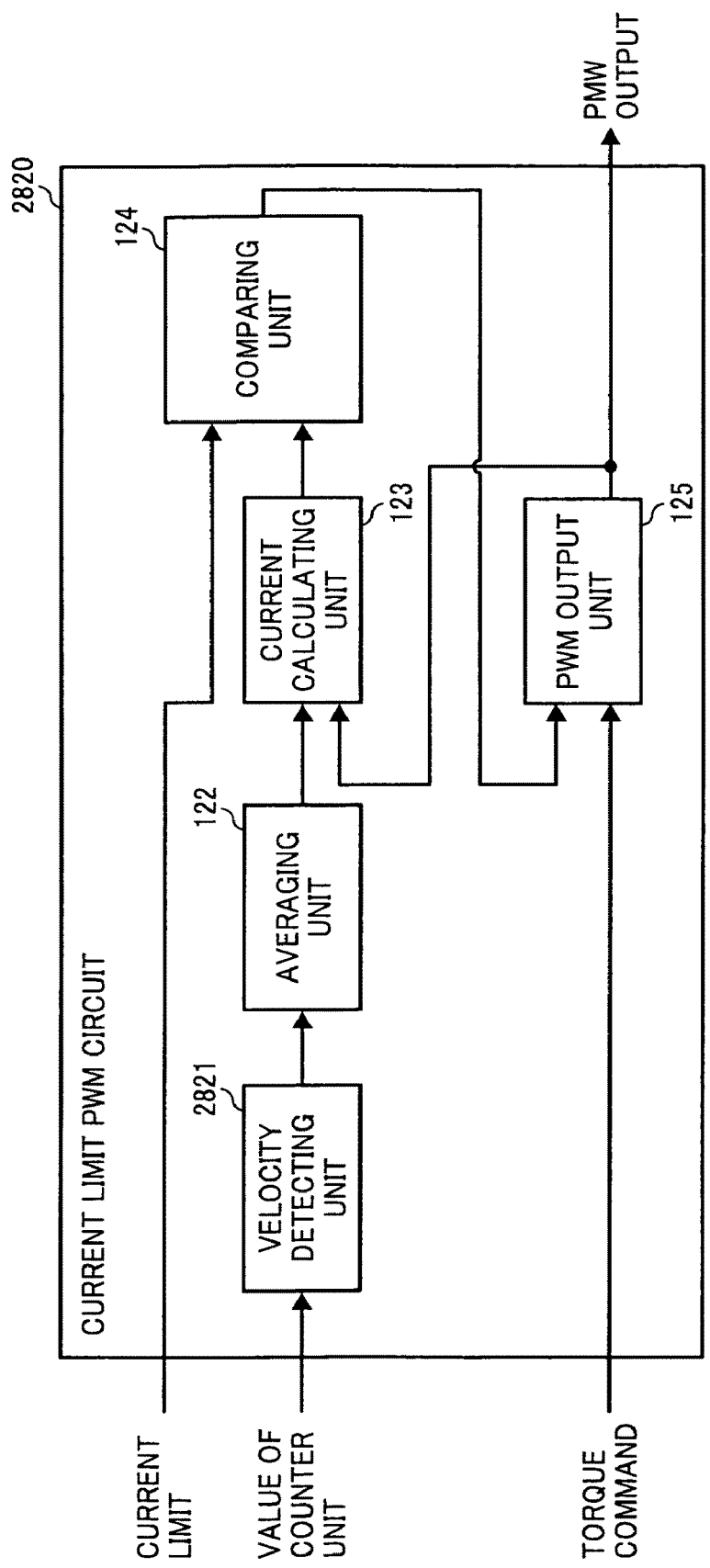
FIG. 27 is a block diagram of a current limit PWM circuit shown in FIG. 26.

The current limit PWM circuit 2820 receives a time interval between pulse signals that the number of clocks is adjusted and counted by the adjusting circuit 2840, and controls a PWM signal based on the received time interval. FIG. 27 is a block diagram of the current limit PWM circuit 2820. As shown in FIG. 27, the current limit PWM circuit 2820 includes a velocity detecting unit 2821, the averaging unit 122, the current calculating unit 123, the comparing unit 124, and the PWM output unit 125. The portions identical to those in FIG. 12 are denoted with the same reference numerals, and the description of those portions is omitted.

The velocity detecting unit 2821 receives a time interval between pulse signals as an output value of a counter unit of the adjusting circuit 2840, and detects a rotation velocity of the main motor 25 based on the received time interval.

The adjusting circuit 2840 adjusts a clock of the counter unit for counting a time interval between FG signals input from the FG 213, and outputs the time interval counted with the adjusted clock.

Figure 28:
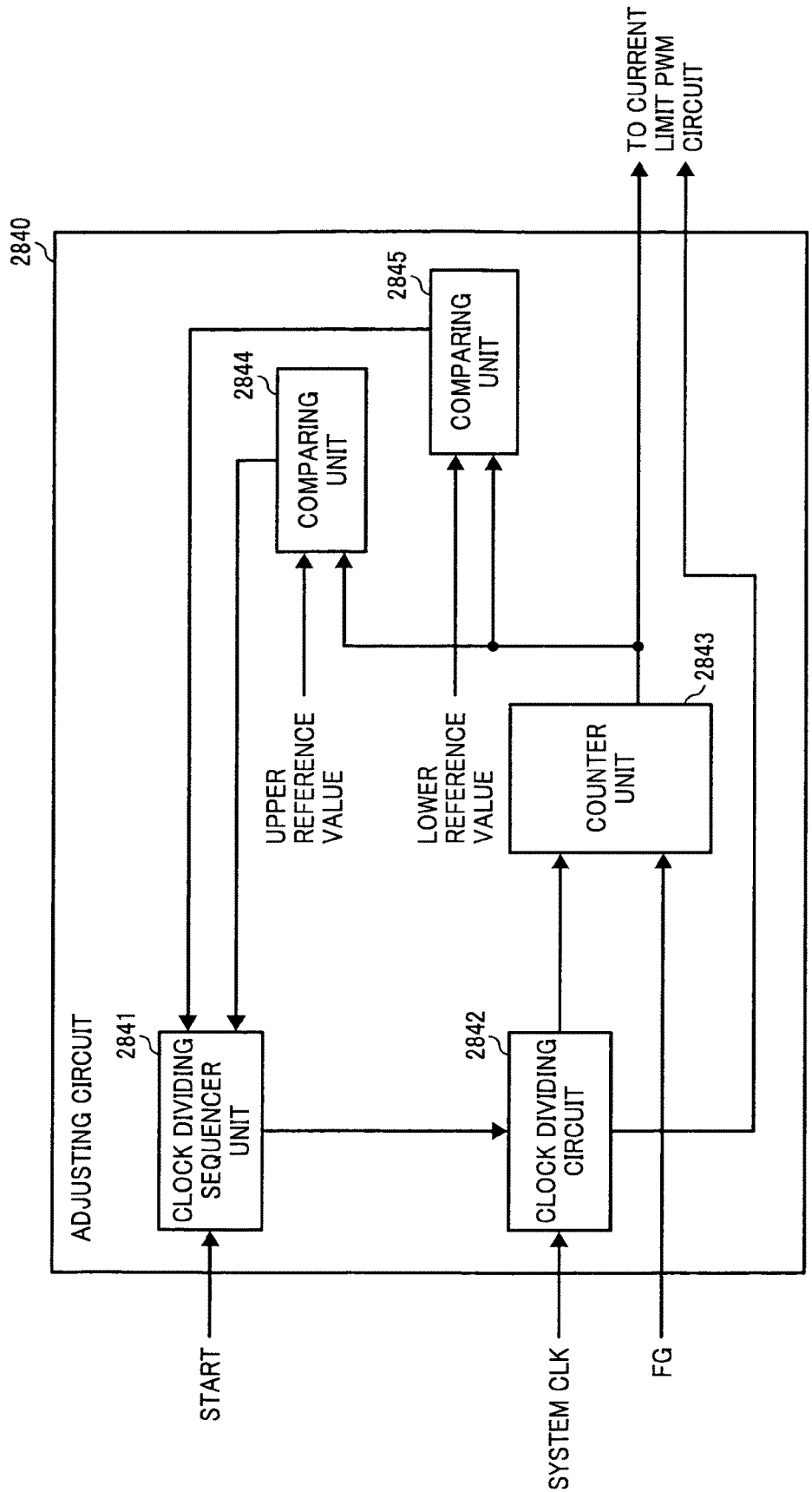
FIG. 28 is a block diagram of an adjusting circuit shown in FIG. 26.

FIG. 28 is a block diagram of the adjusting circuit 2840. As shown in FIG. 28, the adjusting circuit 2840 includes a clock dividing sequencer unit 2841, a clock dividing circuit 2842, a counter unit 2843, a comparing unit 2844, and a comparing unit 2845.

The comparing unit 2844 compares the measured value of the counter unit with a predetermined upper limit (an upper reference value). If the value of the counter unit exceeds the upper reference value, the comparing unit 2844 outputs a signal indicating that the value of the counter unit exceeds the upper reference value to the clock dividing sequencer unit 2841. The comparing unit 2845 compares the value of the counter unit with a predetermined lower limit (a lower reference value). If the value of the counter unit is below the lower reference value, the comparing unit 2845 outputs a signal indicating that the value of the counter unit is below the lower reference value to the clock dividing sequencer unit 2841.

The clock dividing sequencer unit 2841 controls a clock dividing ratio of the counter unit 2843 based on outputs from the comparing unit 2844 and the comparing unit 2845.

The clock dividing circuit 2842 divides a system clock (a system CLK) by the clock dividing ratio set by the clock dividing sequencer unit 2841. The counter unit 2843 counts the number of pulse signals input from the FG 213 with the clock divided by the clock dividing circuit 2842.

Figure 29:
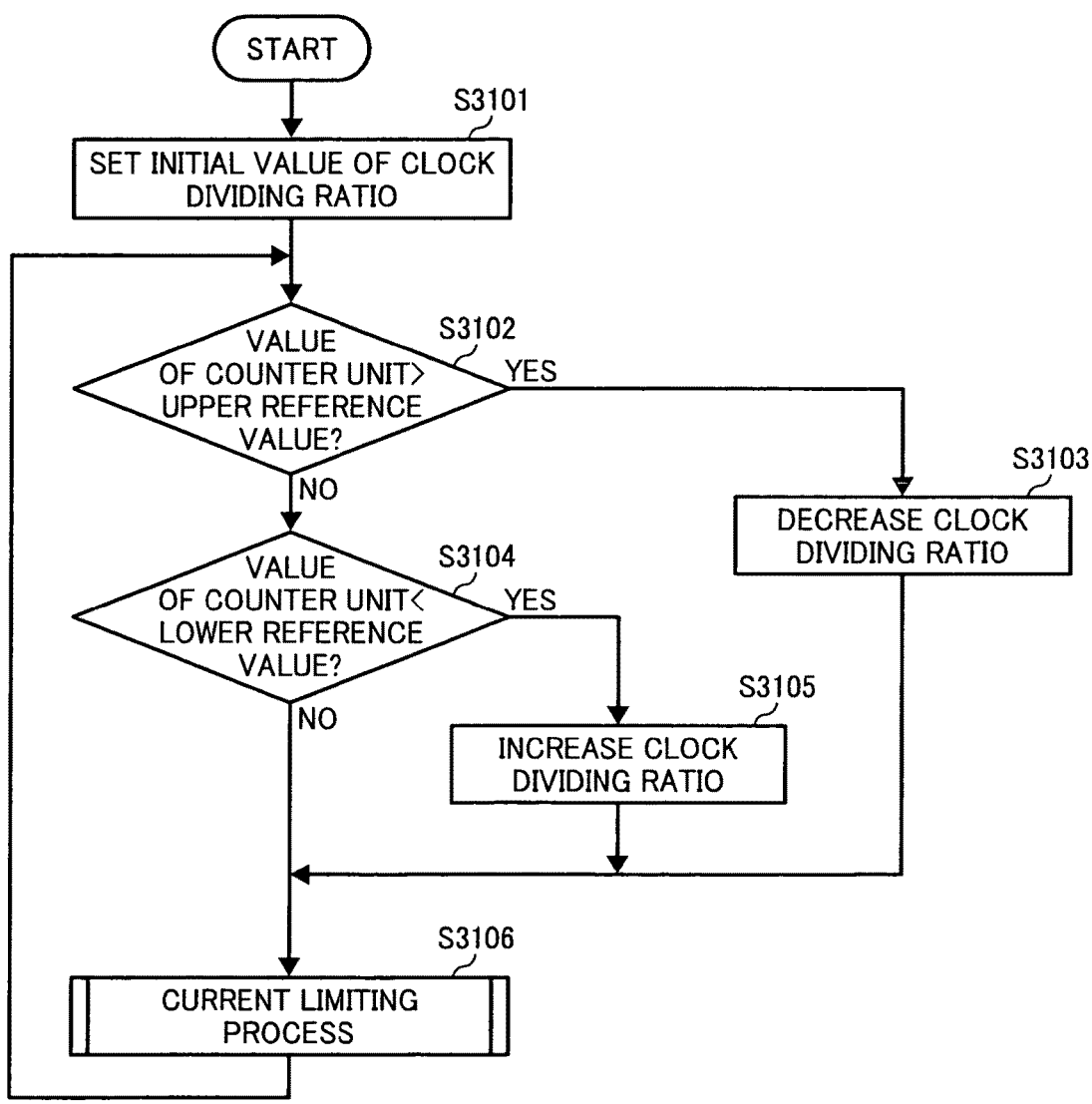
FIG. 29 is a flowchart of a dividing-ratio setting process performed by the motor control device according to the fifth embodiment.

Subsequently, a dividing-ratio setting process performed by the motor control device 2800 is explained below with reference to a flowchart shown in FIG. 29.

The clock dividing sequencer unit 2841 sets up an initial value of a predetermined clock dividing ratio of the counter unit 2843 (Step S3101). After that, the clock dividing circuit 2842 creates a clock with the clock dividing ratio set by the clock dividing sequencer unit 2841. The counter unit 2843 starts counting a time interval between pulse signals input from the FG 213 in accordance with the created clock.

The comparing unit 2844 determines whether a value of the counter unit 2843 is larger than the upper reference value (Step S3102). If the value of the counter unit 2843 is larger than the upper reference value (YES at Step S3102), the clock dividing sequencer unit 2841 decreases the clock dividing ratio (Step S3103). If the value of the counter unit 2843 is not larger than the upper reference value (NO at Step S3102), the comparing unit 2845 determines whether the value of the counter unit 2843 is smaller than the lower reference value (Step S3104).

If the value of the counter unit 2843 is smaller than the lower reference value (YES at Step S3104), the clock dividing sequencer unit 2841 increases the clock dividing ratio (Step S3105). If the value of the counter unit 2843 is not smaller than the lower reference value (NO at Step S3104), there is no need to change the clock cycle, and a current limiting process is performed (Step S3106).

A method of decreasing and increasing the clock dividing ratio at Steps S3103 and S3105 is explained in detail below. Both of a case in which a rotation velocity of the motor gradually decreases and a case in which a rotation velocity of the motor gradually increases are separately explained below.

Figure 30:
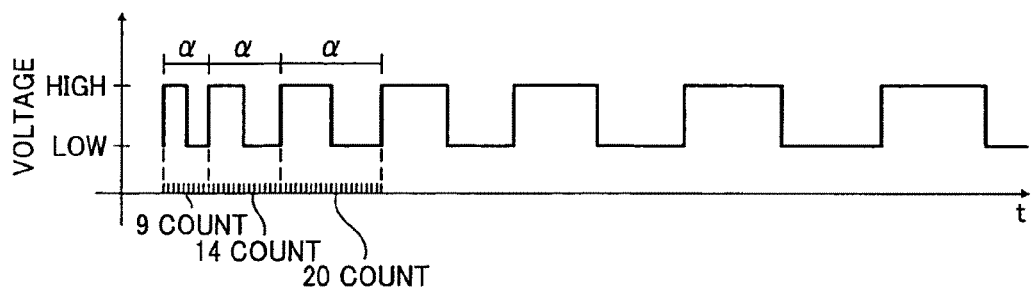
FIG. 30 is a graph for explaining an example of a relationship between a pulse period and a value of a counter unit.

First, the case in which a rotation velocity of the motor gradually decreases is explained below. FIG. 30 is a graph for explaining an example of a relationship between a pulse period and a value of the counter unit 2843. A lateral axis of the graph indicates a time (t), and a longitudinal axis of the graph indicates a voltage detected in each pulse. As shown in FIG. 30, as the rotation velocity of the motor decreases, a pulse period is gradually extended, so that a value of the counter unit 2843 increases when the number of pulses by each pulse interval ($\alpha$) is counted with a constant clock cycle.

In the example shown in FIG. 30, as the rotation velocity of the motor decreases, the value of the counter unit 2843 gradually increases such as 9 counts, 14 counts, and 20 counts.

Figure 31:
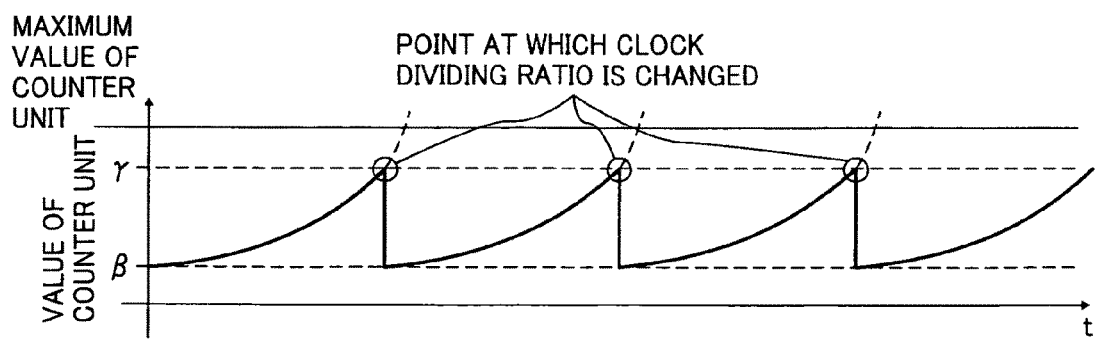
FIG. 31 is a graph of a value of the counter unit by each pulse interval ($\alpha$) when the pulse period is gradually extended.

FIG. 31 is a graph for explaining a value of the counter unit 2843 by each pulse interval ($\alpha$) when a pulse period is gradually extended. A lateral axis of the graph indicates a time (t), and a longitudinal axis of the graph indicates a value of the counter unit 2843. When a value of the counter unit 2843 by each pulse interval is excessively large, an overflow of the counter unit 2843 may occur. Therefore, the comparing unit 2844 determines whether the value of the counter unit 2843 is larger than the upper reference value ($\gamma$). If the value of the counter unit 2843 is larger than the upper reference value ($\gamma$), the clock dividing sequencer unit 2841 determines a clock dividing ratio, and divides a clock by the determined clock dividing ratio. The upper reference value ($\gamma$) is set up to a value that an arbitrary value is subtracted from the maximum value of the counter unit 2843 to prevent an overflow even when a value of the counter unit 2843 of a next pulse interval is larger than expected. Specifically, the clock dividing sequencer unit 2841 converts the clock into a clock having a clock frequency of 1/n. For example, in a case of a "divide-by-2", a pulse period is doubled, so that it is possible to count the number of pulses by half of the value of the counter unit 2843 even when the number of pulses in the same length of the pulse interval is counted. The integral number "n" is referred to as the clock dividing ratio.

When the clock dividing sequencer unit 2841 divides a clock, if an excessively-high dividing ratio is used, the resolution with respect to pulses excessively decreases. If the resolution excessively decreases, an error between a length of a pulse interval detected based on a value of the counter unit 2843 and a rotation velocity of the motor increases. Therefore, a clock dividing ratio of a next pulse interval is set up in such a way that a value of the counter unit 2843 is larger than the lower reference value ($\beta$) based on the previously-obtained value of the counter unit 2843 and the previously-used clock dividing ratio. The lower reference value is arbitrarily determined depending on the required resolution.

Specifically, when the rotation velocity of the motor decreases, and a value of the counter unit 2843 becomes larger than the upper reference value, the clock dividing sequencer unit 2841 sets up the maximum integer smaller than a provisional clock dividing ratio as a clock dividing ratio of a next pulse interval. The provisional clock dividing ratio is obtained by following Equation:

"provisional dividing ratio"=("currently-obtained value of the counter unit 2843"דcurrently-used clock dividing ratio")/"lower reference value ($\beta$)"

Incidentally, as long as the clock dividing ratio is smaller than the provisional clock dividing ratio and also larger than the currently-used clock dividing ratio, the clock dividing ratio needs not be the maximum integer smaller than the provisional dividing ratio.

Then, the case in which a rotation velocity of the motor gradually increases is explained below. As explained in the case in which a rotation velocity of the motor gradually decreases, when a pulse period is excessively long, an overflow of the counter unit 2843 may occur. Therefore, when it can be expected that a rotation velocity of the motor is slow, for example, just after the motor start-up, a clock dividing ratio is increased in advance.

Figure 32:
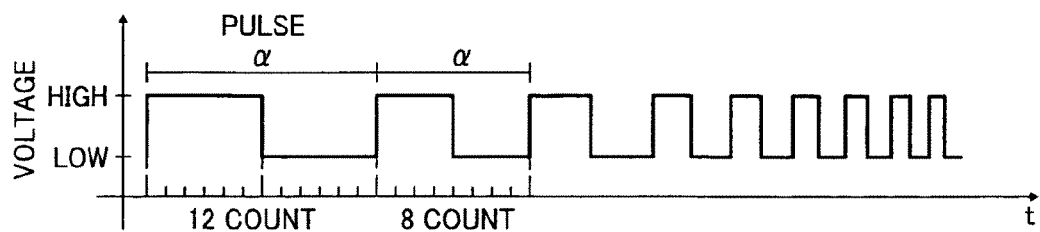
FIG. 32 is a graph for explaining another example of the relationship between the pulse period and a value of the counter unit.

FIG. 32 is a graph for explaining another example of the relationship between the pulse period and a value of the counter unit 2843. A lateral axis of the graph indicates a time (t), and a longitudinal axis of the graph indicates a voltage detected in each pulse. As shown in FIG. 32, as the rotation velocity of the motor increases, the pulse period is gradually shortened, so that a value of the counter unit 2843 decreases when the number of pulses by each pulse interval (α) is counted with a constant clock cycle.

Figure 33:
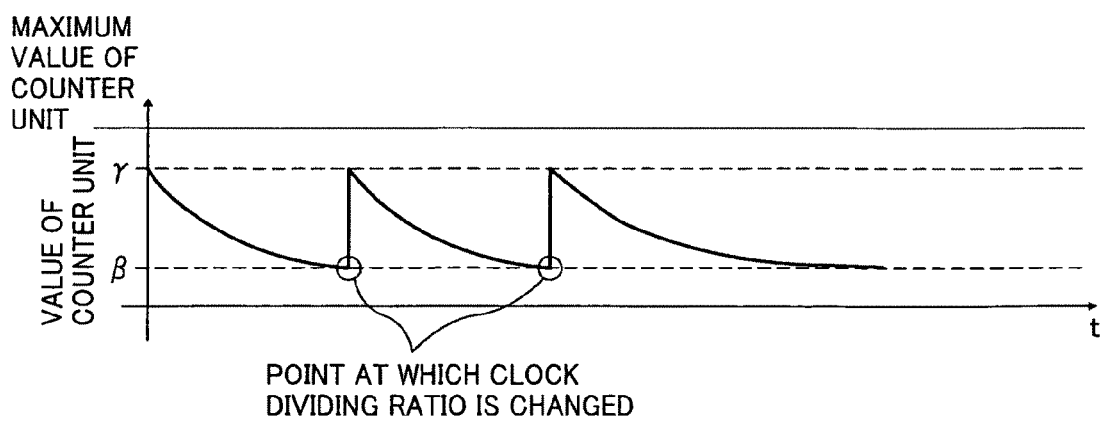
FIG. 33 is a graph of a value of the counter unit by each pulse interval ($\alpha$) when the pulse period is gradually shortened.

FIG. 33 is a graph for explaining a value of the counter unit 2843 by each pulse interval (α) when the pulse period is gradually shortened. A lateral axis of the graph indicates a time (t), and a longitudinal axis of the graph indicates a value of the counter unit. When a value of the counter unit 2843 by each pulse interval is below the lower reference value (β), an error between a length of a pulse interval detected based on a value of the counter unit 2843 and a rotation velocity of the motor increases. Therefore, the comparing unit 2845 determines whether the value of the counter unit 2843 is smaller than the lower reference value (β). If the value of the counter unit 2843 is smaller than the lower reference value (β), the clock dividing sequencer unit 2841 determines a clock dividing ratio at a low ratio.

At this time, if the clock dividing ratio is determined at an excessively low ratio, the number of pulses in the same length of the pulse interval is counted with an unnecessarily short clock. Thus, when a value of the counter unit 2843 of a next pulse interval may overflow. Therefore, a clock dividing ratio to be used in the next pulse interval is set up in such a way that a value of the counter unit 2843 is smaller than the upper reference value (γ) based on a previously-obtained value of the counter unit 2843 and a previously-used clock dividing ratio.

Specifically, when the rotation velocity of the motor increases, and a value of the counter unit 2843 becomes smaller than the lower reference value, the clock dividing sequencer unit 2841 sets up the minimum integer larger than a provisional clock dividing ratio as a clock dividing ratio of a next pulse interval. The provisional clock dividing ratio is obtained by following Equation:

"provisional dividing ratio"=("currently-obtained value of the counter unit 2843"×"currently-used clock dividing ratio")/"upper reference value (γ)"

Incidentally, as long as the clock dividing ratio is larger than the provisional clock dividing ratio and also smaller than the currently-used clock dividing ratio, the clock dividing ratio needs not be the minimum integer larger than the provisional clock dividing ratio.

When a value of the counter unit 2843 is smaller than the upper reference value and also larger than the lower reference value, the clock dividing sequencer unit 2841 does not change the clock dividing ratio, and the current limiting process is performed.

Figure 34:
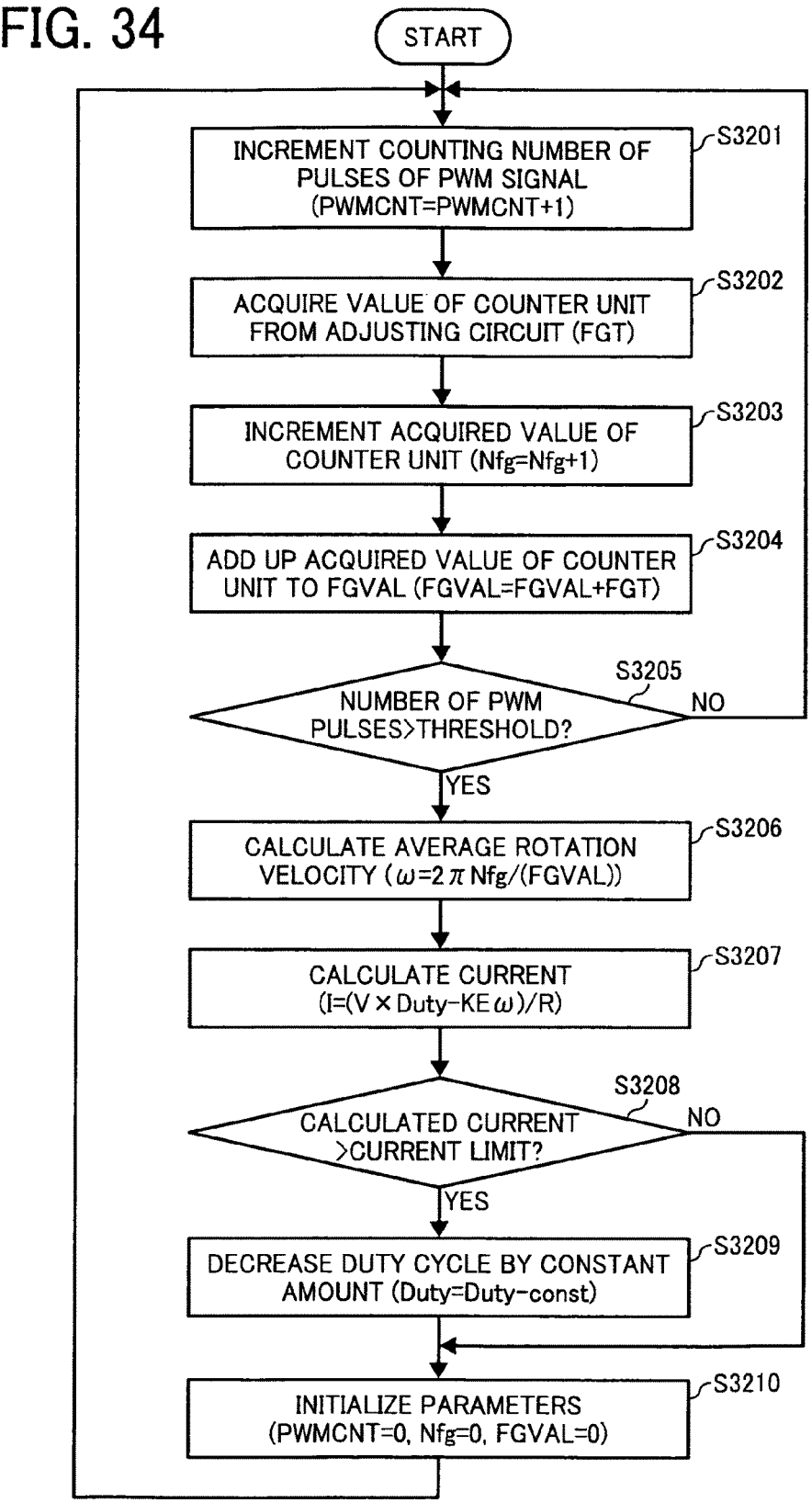
FIG. 34 is a flowchart of a current limiting process performed by the motor control device according to the fifth embodiment.

Subsequently, the current limiting process at Step S3106 is explained in detail below. FIG. 34 is a flowchart of the current limiting process performed by the motor control device according to the fifth embodiment.

The current limit PWM circuit 2820 increments the counting number of pulses of a PWM signal by one (Step S3201). The velocity detecting unit 2821 acquires a value of the counter unit 2843 of the adjusting circuit 2840 (Step S3202), and increments the acquired value of the counter unit 2843 by one (Step S3203). Then, the velocity detecting unit 2821 adds the acquired value of the counter unit 2843 as a time interval between pulse signals to the FGVAL (Step S3204).

The portions at Steps S3205 to S3210 are identical to those at Steps S1305 to S1310 in FIG. 13, and the description of those portions is omitted.

As described above, the clock dividing sequencer unit 2841 calculates a clock dividing ratio that meets predetermined conditions determined based on a currently-acquired value of the counter unit 2843, a currently-used clock dividing ratio, the upper reference value (γ), and the lower reference value (β), and sets the calculated clock dividing ratio as a clock dividing ratio to be used in a next pulse interval. Alternatively, the clock dividing sequencer unit 2841 can be configured to change a clock dividing ratio with a predetermined ratio and set the changed clock dividing ratio as a clock dividing ratio to be used in a next pulse interval.

In this case, the comparing unit 2844 determines whether a value of the counter unit 2843 is larger than the upper reference value. If the value of the counter unit 2843 is larger than the upper reference value, the clock dividing sequencer unit 2841 increases a clock dividing ratio by the predetermined ratio. For example, when the predetermined ratio is two times, the clock dividing sequencer unit 2841 doubles a clock dividing ratio. If the value of the counter unit 2843 is not larger than the upper reference value, the comparing unit 2845 determines whether the value of the counter unit 2843 is smaller than the lower reference value.

If the value of the counter unit 2843 is smaller than the lower reference value, the clock dividing sequencer unit 2841 decreases a clock dividing ratio by the predetermined ratio. For example, when the predetermined ratio is one-half, the clock dividing sequencer unit 2841 divides a clock dividing ratio by two. If the value of the counter unit 2843 is not smaller than the lower reference value, the clock dividing sequencer unit 2841 does not change a clock dividing ratio, and the current limiting process is performed. A flow of the current limiting process is identical to those in the fifth embodiment, and the description of those portions is omitted.

Figure 35:
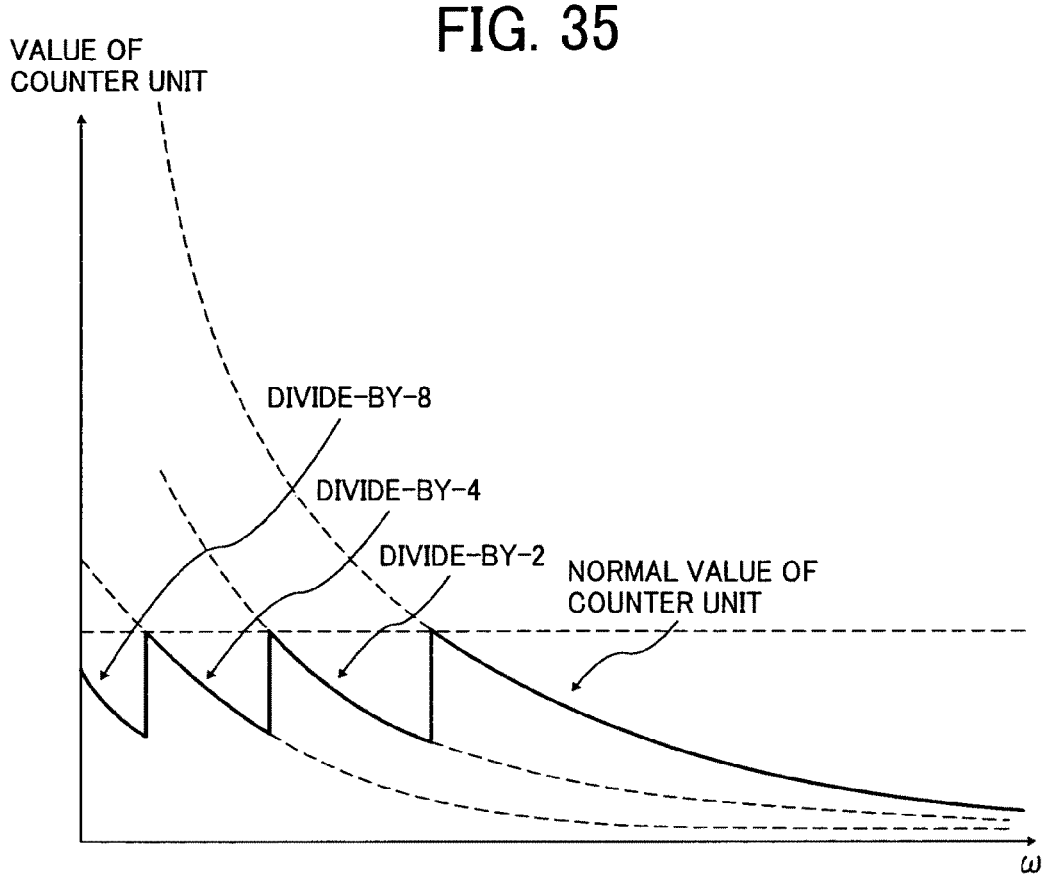
FIG. 35 is a graph for explaining an example of a relationship between a rotation velocity of the motor and a value of the counter unit.

FIG. 35 is a graph for explaining an example of a relationship between a rotation velocity of the motor and a value of a counter unit those obtained by a motor control device according to a modification of the fifth embodiment. In the example shown in FIG. 35, just after the motor start-up, the counter unit starts counting up the number of pulses with a clock divided by 8 as a normal clock dividing ratio. As the rotation velocity of the motor gradually increases, the clock dividing ratio changes from divide-by-8 to divide-by-4, divide-by-2, and divide-by-1 in order. Namely, the counter unit starts counting up the number of pulses with a clock divided by 8 when the motor starts up. When the rotation velocity of the motor reaches a predetermined high level, the counter unit counts up the number of pulses with a clock divided by 4. When the rotation velocity of the motor reaches a predetermined higher level, the counter unit counts up the number of pulses with a clock divided by 2. In the event, the counter unit counts up the number of pulses without changing a clock dividing ratio. Therefore, even when the rotation velocity of the motor is low, the counter unit can be prevented from an overflow.

Figure 36:
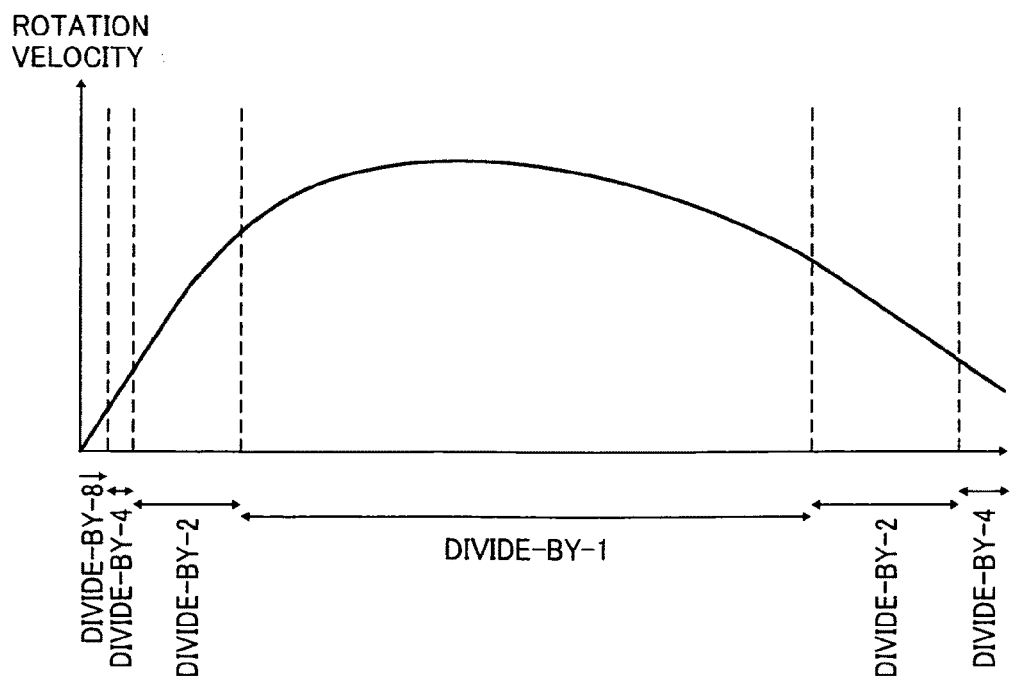
FIG. 36 is a graph for explaining temporal changes in the rotation velocity of the motor and a clock dividing ratio.

FIG. 36 is a graph for explaining temporal changes in a rotation velocity of the motor and a clock dividing ratio. As shown in FIG. 36, in the modification of the fifth embodiment, the adjusting circuit controls the clock dividing ratio so that as the rotation velocity of the motor increases, the clock dividing ratio decreases, conversely, as the rotation velocity of the motor decreases, the clock dividing ratio increases again.

In this manner, in the modification of the fifth embodiment, a rotation velocity of the motor is calculated based on a time interval between FG signals counted with a clock dividing ratio adjusted by the adjusting circuit. After the calculation of the rotation velocity, the current limiting process shown in FIG. 15 can be performed in the same manner as the modification of the first embodiment.

As described above, in the motor control device according to the fifth embodiment and the modification of the fifth embodiment, an overflow of the counter unit can be prevented to extend a cycle of measuring a rotation velocity of the motor when the rotation velocity of the motor is low, and can keep the resolution at least a required arbitrary level to shorten the cycle of measuring the rotation velocity of the motor when the rotation velocity of the motor is high.

A motor control computer program executed by the motor control device according to the first to fifth embodiments can be stored in a computer-readable recording medium, such as a compact disk read-only memory (CD-ROM), a flexible disk (FD), a CD recordable (CD-R), and a digital versatile disk (DVD), in an installable format or an executable format so that the motor control computer program can be read out from the recording medium.

Alternatively, the motor control computer program can be stored in a computer connected to a network such as the Internet so that the motor control computer program can be downloaded via the network. Moreover, the motor control computer program can be provided or distributed via a network such as the Internet.

The motor control computer program includes modules including the above-mentioned units (the velocity detecting unit, the averaging unit, the current calculating unit, the comparing unit, the PWM output unit, and the like). When a central processing unit (CPU) as an actual hardware reads out the motor control computer program from a read-only memory (ROM) to execute the motor control computer program, the units are loaded into a main storage unit to be created thereon.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A device for controlling a motor, comprising:
    a control unit that controls a drive signal for determining a voltage to be supplied to the motor; and
    a drive unit that drives the motor by applying a current corresponding to the voltage determined based on the drive signal to the motor, wherein the control unit includes:
        a velocity detecting unit that detects a rotation velocity of the motor,
        a calculating unit that calculates a current applied to the motor based on the rotation velocity of the motor;
        a comparing unit that compares the current calculated by the calculating unit with a current limit; and
        an output unit that outputs the drive signal that decreases the voltage to a level lower than a voltage at the time of calculating the current when the current calculated by the calculating unit is larger than the current limit,
        wherein the calculating unit calculates a difference between the voltage determined based on the drive signal and an induced voltage that is proportional to the rotation velocity of the motor detected by the velocity detecting unit, and calculates the current based on the difference and an electric resistance of a coil of the motor.

2. The device according to claim 1, wherein the output unit outputs the drive signal corresponding to an initial voltage that is calculated based on an electric resistance of a coil of the motor and the current limit at an initial state in which the motor is stopped.

3. The device according to claim 1, further comprising an averaging unit that calculates an average rotation velocity of the motor, wherein
    the calculating unit calculates the current based on the average rotation velocity of the motor calculated by the averaging unit.

4. The device according to claim 1, wherein when the current calculated by the calculating unit is larger than the current limit, the output unit outputs a drive signal that decreases the voltage to zero.

5. The device according to claim 1, wherein
    the drive signal is a pulse-width modulation signal for determining the voltage with a pulse-width modulation method, and
    when the current calculated by the calculating unit is larger than the current limit, the output unit decreases a duty cycle of the pulse-width modulation signal by a predetermined amount.

6. The device according to claim 1, wherein the output unit outputs a predetermined first initial value of the drive signal in a period from an initial state in which the motor is stopped to a predetermined first time.

7. The device according to claim 6, wherein the output unit outputs a predetermined second initial value of the drive signal in a period from the initial state to a predetermined second time that is shorter than the first time.

8. The device according to claim 7, wherein the second time is determined based on an electrical time constant of a coil of the motor.

9. The device according to claim 7, wherein the second initial value is a drive signal that maximizes the voltage in the period from the initial state to the second time.

10. An image forming apparatus that forms a toner image on a transfer member, comprising:
    a conveying unit that is supported in a rotatable manner, and conveys the transfer member;
    an image carrier that is supported in a rotatable manner, and carries the toner image;
    a charging unit that uniformly-charges a surface of the image carrier;
    a latent-image forming unit that forms a latent image on a surface of the image carrier that is uniformly-charged by the charging unit;
    a developing unit that develops the latent image formed by the latent-image forming unit into the toner image;
    a transfer unit that is supported in a rotatable manner, and transfers the toner image developed by the developing unit onto the transfer member; and
    a motor control device according to claim 1 that controls driving a motor to rotate at least one of the conveying unit, the image carrier, the transferred member, and the transfer unit.

11. A device for controlling a motor, comprising:
    a control unit that controls a drive signal for determining a voltage to be supplied to the motor; and
    a drive unit that drives the motor by applying a current corresponding to the voltage determined based on the drive signal to the motor, wherein the control unit includes:
        a velocity detecting unit that detects a rotation velocity of the motor,
        a calculating unit that calculates a current applied to the motor based on the rotation velocity of the motor;
        a comparing unit that compares the current calculated by the calculating unit with a current limit; and
        an output unit that outputs the drive signal that decreases the voltage to a level lower than a voltage at the time of calculating the current when the current calculated by the calculating unit is larger than the current limit, wherein:

the drive signal is a pulse-width modulation signal for determining the voltage with a pulse-width modulation method, the control unit further includes a storing unit that stores therein the rotation velocity of the motor and a duty cycle of the pulse-width modulation signal corresponding to the voltage with which the current that is lower than the current limit can be applied, in association with each other, and the output unit acquires a drive signal corresponding to the rotation velocity of the motor from the storing unit, and outputs an acquired drive signal.

12. A device for controlling a motor, comprising:
a control unit that controls a drive signal for determining a voltage to be supplied to the motor; and
a drive unit that drives the motor by applying a current corresponding to the voltage determined based on the drive signal to the motor, wherein the control unit includes:
a velocity detecting unit that detects a rotation velocity of the motor,
a calculating unit that calculates a current applied to the motor based on the rotation velocity of the motor;
a comparing unit that compares the current calculated by the calculating unit with a current limit;
an output unit that outputs the drive signal that decreases the voltage to a level lower than a voltage at the time of calculating the current when the current calculated by the calculating unit is larger than the current limit, wherein:
a counter unit that counts number of pulses within the time interval based on a clock of a predetermined cycle;
a count-value comparing unit that compares the number of pulses counted by the counter unit with a predetermined upper limit and a predetermined lower limit;
a clock-dividing-ratio setting unit that sets a dividing ratio of the clock to be higher than that is used when the counter unit counts the number of pulses if the number of pulses counted by the counter unit is larger than the upper limit, and to be lower than that is used when the counter unit counts the number of pulses if the number of pulses counted by the counter unit is smaller than the lower limit; and
a dividing unit that divides the clock by the dividing ratio set by the clock-dividing-ratio setting unit, wherein:
the velocity detecting unit detects the rotation velocity of the motor based on the number of pulses counted with the clock divided by the dividing unit, and
the velocity detecting unit receives an input of a pulse signal in response to number of revolutions of the motor, and detects the rotation velocity of the motor based on a time interval between received pulse signals.

13. The device according to claim 12, wherein when the number of pulses counted by the counter unit is larger than the upper limit, the clock-dividing-ratio setting unit sets the dividing ratio to be equal to or smaller than a value obtained by dividing a product of the number of pulses and the dividing ratio used when the counter unit counts the number of pulses by the lower limit and equal to or larger than the dividing ratio used when the counter unit counts the number of pulses.

14. The device according to claim 12, wherein when the number of pulses counted by the counter unit is smaller than the lower limit, the clock-dividing-ratio setting unit sets the dividing ratio to be equal to or larger than a value obtained by dividing a product of the number of pulses and the dividing ratio used when the counter unit counts the number of pulses by the upper limit and equal to or smaller than the dividing ratio used when the counter unit counts the number of pulses.

15. The device according to claim 12, wherein
when the number of pulses counted by the counter unit is larger than the upper limit, the clock-dividing-ratio setting unit multiplies the dividing ratio used when the counter unit counts the number of pulses by a predetermined constant larger than unity, and
when the number of pulses counted by the counter unit is smaller than the lower limit, the clock-dividing-ratio setting unit divides the dividing ratio used when the counter unit counts the number of pulses by the constant.

* * * * *